US011206538B2

(12) United States Patent
Xu et al.

(10) Patent No.: US 11,206,538 B2
(45) Date of Patent: Dec. 21, 2021

(54) CONTROL SIGNALING PROCESSING METHOD, DEVICE, AND SYSTEM

(71) Applicant: HUAWEI TECHNOLOGIES CO., LTD., Shenzhen (CN)

(72) Inventors: Haibo Xu, Beijing (CN); Xuelong Wang, Beijing (CN); Nathan Edward Tenny, San Diego, CA (US); Xin You, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 360 days.

(21) Appl. No.: 16/338,469

(22) PCT Filed: Sep. 30, 2016

(86) PCT No.: PCT/CN2016/101410
§ 371 (c)(1),
(2) Date: Mar. 30, 2019

(87) PCT Pub. No.: WO2018/058687
PCT Pub. Date: Apr. 5, 2018

(65) Prior Publication Data
US 2019/0253895 A1 Aug. 15, 2019

(51) Int. Cl.
*H04W 12/106* (2021.01)
*H04W 12/10* (2021.01)
(Continued)

(52) U.S. Cl.
CPC ........ *H04W 12/106* (2021.01); *H04W 12/06* (2013.01); *H04W 12/10* (2013.01);
(Continued)

(58) Field of Classification Search
CPC ... H04W 84/045; H04W 12/08; H04W 76/19; H04W 12/02; H04W 12/10; H04W 12/106; H04W 12/037; H04W 12/06
See application file for complete search history.

(56) References Cited

U.S. PATENT DOCUMENTS 7,826,824 B2 * 11/2010 Fischer ............... H04W 12/106
455/410
9,094,832 B2 7/2015 Yi et al.
(Continued)

FOREIGN PATENT DOCUMENTS

CN 101155026 A 4/2008
CN 101159893 A 4/2008
(Continued)

*Primary Examiner* — Dung Hong
(74) *Attorney, Agent, or Firm* — Hauptman Ham, LLP

(57) ABSTRACT

A control signaling processing method, a device, and a system relate to the field of communications technologies, to perform integrity protection on control signaling exchanged between a DU and UE in a CU-DU separated access network architecture. The method includes: determining, by a DU, integrity protection parameters and an integrity protection algorithm, where the integrity protection parameters and the integrity protection algorithm are used to perform integrity protection on a signaling radio bearer between the DU and UE; determining, by the DU, a message authentication code MAC-I based on the integrity protection parameters and the integrity protection algorithm; and receiving, by the DU, control signaling sent by an RRC layer of the DU, and sending, to the UE, the control signaling carrying the MAC-I.

20 Claims, 11 Drawing Sheets

(51) Int. Cl.
  *H04W 24/10* (2009.01)
  *H04W 12/06* (2021.01)
  *H04W 36/00* (2009.01)

(52) U.S. Cl.
  CPC ....... *H04W 24/10* (2013.01); *H04W 36/0016* (2013.01); *H04W 36/0038* (2013.01); *H04W 36/0061* (2013.01)

(56) References Cited

U.S. PATENT DOCUMENTS

| | | | |
|---|---|---|---|
| 9,253,634 B2* | 2/2016 | Yang | H04W 36/24 |
| 2002/0066011 A1* | 5/2002 | Vialen | H04W 12/121 |
| | | | 713/150 |
| 2007/0153793 A1* | 7/2007 | Jiang | H04L 63/12 |
| | | | 370/390 |
| 2007/0297367 A1* | 12/2007 | Wang | H04L 63/0414 |
| | | | 370/331 |
| 2009/0061878 A1* | 3/2009 | Fischer | H04W 28/12 |
| | | | 455/436 |
| 2009/0163211 A1* | 6/2009 | Kitazoe | H04W 74/0866 |
| | | | 455/436 |
| 2009/0325634 A1* | 12/2009 | Bienas | H04W 72/0426 |
| | | | 455/552.1 |
| 2010/0246382 A1* | 9/2010 | Yi | H04L 63/12 |
| | | | 370/216 |
| 2011/0092236 A1* | 4/2011 | Iwamura | H04W 12/106 |
| | | | 455/507 |
| 2011/0299681 A1* | 12/2011 | Kubota | H04L 1/1607 |
| | | | 380/247 |
| 2013/0235803 A1* | 9/2013 | Yi | H04L 63/123 |
| | | | 370/328 |
| 2013/0310006 A1* | 11/2013 | Chen | H04W 12/0431 |
| | | | 455/411 |
| 2014/0192631 A1* | 7/2014 | Yi | H04W 12/033 |
| | | | 370/216 |
| 2015/0126154 A1 | 5/2015 | Yang | |
| 2015/0296414 A1 | 10/2015 | Yi et al. | |
| 2015/0359019 A1 | 12/2015 | Chen et al. | |
| 2017/0048752 A1 | 2/2017 | Xiong et al. | |
| 2017/0324608 A1* | 11/2017 | Ohta | H04W 92/18 |
| 2018/0091485 A1* | 3/2018 | Lee | H04W 12/043 |
| 2018/0160467 A1* | 6/2018 | Quan | H04W 12/037 |
| 2018/0167807 A1* | 6/2018 | Ying | H04L 9/0838 |
| 2018/0249479 A1* | 8/2018 | Cho | H04W 12/086 |
| 2018/0302944 A1* | 10/2018 | Chang | H04W 76/19 |

FOREIGN PATENT DOCUMENTS

| | | |
|---|---|---|
| CN | 101675618 A | 3/2010 |
| CN | 101904213 A | 12/2010 |
| CN | 102007797 A | 4/2011 |
| CN | 102238542 A | 11/2011 |
| CN | 102714794 A | 10/2012 |
| CN | 102740289 A | 10/2012 |
| CN | 102857920 A | 1/2013 |
| CN | 102883440 A | 1/2013 |
| CN | 103582078 A | 2/2014 |
| CN | 103945559 A | 7/2014 |
| CN | 104185177 A | 12/2014 |
| WO | 2013173957 A1 | 11/2013 |

* cited by examiner

CONTROL SIGNALING PROCESSING METHOD, DEVICE, AND SYSTEM

CROSS-REFERENCE TO RELATED APPLICATIONS

This application is a national stage of International Application No. PCT/CN2016/101410, filed on Sep. 30, 2016, which is hereby incorporated by reference in its entirety.

TECHNICAL FIELD

The present invention relates to the field of communications technologies, and in particular, to a control signaling processing method, a device, and a system.

BACKGROUND

Currently, the 3rd Generation Partnership Project (English: 3rd Generation Partnership Project, 3GPP) has already begun to discuss a network architecture oriented to a 5th-Generation mobile communications technology (English: 5th-Generation, 5G) application, and the network architecture includes an access network and a core network. To improve a data transmission capacity, an access network architecture is a layered architecture. To be specific, an access network includes two network elements. One network element is a central unit (English: Central Unit, CU), and the other network element is a distributed unit (English: Distributed Unit, DU). One CU is connected to a plurality of DUs, and one DU is connected to a plurality of user equipments (English: User Equipment, UE). In this access network architecture, division of a possible control plane protocol stack between a CU and a DU is shown in FIG. 1. The CU includes a Radio Resource Control Protocol (English: Radio Resource Control, RRC) layer and a Packet Data Convergence Protocol (English: Packet Data Convergence Protocol, PDCP) layer, and the DU includes: a Radio Link Control (English: Radio Link Control, RLC) layer, a Media Access Control (English: Medium Access Control, MAC) layer, and a physical layer (English: Physical layer).

In this access network architecture, if only the CU has a Radio Resource Control/management function, the following two problems exist: (1) When control signaling needs to be transmitted between the CU and UE, a non-ideal link between the CU and the DU causes an increase in a transmission delay of the control signaling. (2) When the UE moves between different DUs, the CU needs to transmit the control signaling between the CU and the UE by using a DU. For example, the DU reports a measurement result of the UE to the CU, and the CU sends handover signaling to the UE by using the DU to control handover of the UE. In this case, transfer of the control signaling between the CU and the DU causes an increase in signaling overheads.

To resolve the foregoing two problems, a method is to decentralize some Radio Resource Control functions of a CU to a DU. For example, when UE performs handover between different DUs connected to a same CU, a DU may directly perform control without a need of reporting a measurement result to the CU by using the DU and then transferring a handover command generated by the CU to the UE by using the DU. This method can resolve the foregoing two problems. However, to implement a control function on a DU side, pieces of control signaling exchanged between the DU and the UE need to be defined, and integrity protection processing needs to be performed on these pieces of control signaling. However, in this CU-DU separated access network architecture, there is currently no solution about how to perform integrity protection on the control signaling exchanged between the DU and the UE.

SUMMARY

Embodiments provide a method for performing integrity protection on control signaling, a device, and a system, to perform integrity protection on control signaling exchanged between a DU and UE in a CU-DU separated access network architecture.

To achieve the foregoing objective, this application uses the following technical solutions.

A first aspect provides a control signaling processing method. The method may be applied to an access network architecture including a first network device and a second network device, the first network device may be connected to a plurality of second network devices, the second network device may be connected to a plurality of user equipments UEs, the method is performed by the second network device, the second network device may include a first protocol layer entity and a second protocol layer entity, and the method may include:

establishing, by the second network device, a signaling radio bearer between the second network device and user equipment UE, and transmitting control signaling between the second network device and the UE through the signaling radio bearer; determining, by the first protocol layer entity of the second network device, integrity protection parameters and an integrity protection algorithm that are used to perform integrity protection on the control signaling, and triggering the second protocol layer entity of the second network device to determine a message authentication code MAC-I based on the integrity protection parameters and the integrity protection algorithm; and receiving, by the second protocol layer entity of the second network device, the control signaling sent by the first protocol layer entity of the second network device, and sending, to the UE, the control signaling carrying the MAC-I.

The first network device may be a central unit located in a central equipment room, such as a baseband unit, the second network device may be a distributed unit relatively close to the UE, such as a remote radio unit, the first protocol layer entity of the second network device may be a Radio Resource Control Protocol RRC layer, and the second protocol layer entity of the second network device may be a Packet Data Convergence Protocol PDCP layer.

Therefore, by using the first protocol layer entity and the second protocol layer entity that are built in the second network device, the second network device may exchange the control signaling between the second network device and the UE, and perform integrity protection on the control signaling. When the first network device is a CU, and the second network device is a DU, a function of performing, by the DU, integrity protection on the control signaling exchanged between the DU and the UE in a CU-DU separated access network architecture is implemented.

In some embodiments, the foregoing integrity protection parameters may include but are not limited to: an identifier of the signaling radio bearer and a third key that is used to perform integrity protection on the signaling radio bearer between the second network device and the UE.

With reference to the first aspect, in a possible implementation of the first aspect, the integrity protection parameters and the integrity protection algorithm may be obtained in the following manner:

before the establishing, by the second network device, a signaling radio bearer between the second network device and user equipment UE, receiving, by the second network device, a signaling radio bearer establishment request that is used to request the second network device to establish the signaling radio bearer between the second network device and the UE and that is sent by the first network device, and determining the identifier of the signaling radio bearer, where the signaling radio bearer establishment request may include: a first key and at least one integrity protection algorithm that the UE can support;

obtaining, by the first protocol layer entity of the second network device, the first key sent by the first network device, and the at least one integrity protection algorithm that the UE can support;

generating, by the first protocol layer entity of the second network device, a first random number;

generating, by the first protocol layer entity of the second network device, a second key based on the first random number and the first key, and generating, based on the second key, the third key that is used to perform integrity protection on the signaling radio bearer between the second network device and the UE; and determining, by the first protocol layer entity of the second network device, the integrity protection algorithm in the at least one integrity protection algorithm that the UE can support.

The first key is generated by the first network device based on a cell identifier of a primary serving cell, of the UE, operated by the second network device, a carrier frequency of the primary serving cell, and a root key.

The root key can be used to generate a key used to perform integrity protection on control signaling between a CU and the UE.

Therefore, the second network device may obtain the integrity protection parameters and the integrity protection algorithm that are required for performing integrity protection.

Correspondingly, for the peer UE, the integrity protection parameters and the integrity protection algorithm are required for performing integrity check on the received control signaling. In this case, the second network device may directly send the integrity protection parameters and the integrity protection algorithm that are required for performing integrity protection to the UE, or may send, by using the first network device, the integrity protection parameters and the integrity protection algorithm that are required for performing integrity protection to the UE.

Specifically, with reference to the first aspect or any possible implementation of the first aspect, in a possible implementation of the first aspect, the method may further include:

returning, by the second network device, a signaling radio bearer establishment response message to the first network device, where the signaling radio bearer establishment response message includes: the identifier of the signaling radio bearer, the first random number, and the integrity protection algorithm; and in the implementation, the signaling radio bearer establishment request may include: a first key and at least one integrity protection algorithm that the UE can support.

With reference to the first aspect or any possible implementation of the first aspect, in another possible implementation of the first aspect, the method may further include:

returning, by the second network device, a signaling radio bearer establishment response message including the identifier of the signaling radio bearer to the first network device;

receiving, by the second network device, a security context establishment request message of the UE that is sent by the first network device and that includes the first key and the at least one integrity protection algorithm that the UE can support;

returning, by the second network device, a security context establishment response message to the first network device;

determining, by the first protocol layer entity of the second network device, the integrity protection algorithm in the at least one integrity protection algorithm that the UE can support; and sending, by the first protocol layer entity of the second network device, a security activation message to the UE, where the security activation message includes: the first random number and the integrity protection algorithm.

Therefore, the integrity protection parameters required for performing integrity protection or parameters from which the integrity protection parameters required for integrity protection are further derived, and the integrity protection algorithm may be sent to the peer UE by using the first network device or the second network device.

Further, in some cases (for example, the following case 1 or 2), a key required for performing integrity protection between the DU and the UE is updated: Case 1: The root key is changed. Case 2: Key update is required between the DU and the UE. For example, a random number is changed. In this case, regardless of a case in which key update occurs, both the DU and the UE need to simultaneously perform key change based on an update status, to avoid an integrity protection failure caused by inconsistent integrity protection parameters required when integrity protection is performed.

Specifically, with reference to the first aspect or any possible implementation of the first aspect, in still another possible implementation of the first aspect, if the root key is changed, the method may further include:

receiving, by the second network device, a key update request message that is sent by the first network device and that includes a new first key generated based on the changed root key;

generating, by the first protocol layer entity of the second network device, a second random number;

sending, by the first protocol layer entity of the second network device, a key modification request message to the UE, where the key modification request message includes the second random number; and receiving, by the first protocol layer entity of the second network device, a key modification response message returned by the UE.

With reference to the first aspect or any possible implementation of the first aspect, in yet another possible implementation of the first aspect, the method may further include:

generating, by the first protocol layer entity of the second network device, a third random number, where the third random number may be the same as or different from the original first random number;

sending, by the first protocol layer entity of the second network device, a key modification request message to the UE, where the key modification request message includes the third random number; and receiving, by the first protocol layer entity of the second network device, a key modification response message returned by the UE.

Therefore, when a key is changed, two ends, namely, the DU and the UE update, in time, a key required for performing integrity protection, to avoid a problem of an integrity protection failure.

A second aspect provides a control signaling processing method, performed by user equipment UE. The method may include:

establishing, by the UE, a signaling radio bearer between the UE and a second network device, and transmitting control signaling between the UE and the second network device through the signaling radio bearer; determining, by the UE, integrity protection parameters and an integrity protection algorithm that are used to perform integrity protection on the control signaling; receiving, by the UE, control signaling that carries a message authentication code MAC-I and that is sent by a second protocol layer entity of the second network device; and performing, by the UE, integrity check on the control signaling based on the integrity protection parameters and the integrity protection algorithm.

The performing, by the UE, integrity check on the control signaling based on the integrity protection parameters and the integrity protection algorithm may include:

obtaining, by the UE, a MAC-I based on the integrity protection parameters and the integrity protection algorithm, comparing the obtained MAC-I with the MAC-I in the received control signaling, where if the two are the same, it indicates that integrity check succeeds, or if the two are different, it indicates that integrity check fails.

Therefore, the UE may perform, by using the integrity protection parameters and the integrity protection algorithm that are obtained, integrity protection check on the received control signaling sent by the DU, to implement integrity protection on the control signaling between the UE and the DU.

In some embodiments, the integrity protection parameters may include but are not limited to: an identifier of the signaling radio bearer between the second network device and the UE and a third key that is used to perform integrity protection on the signaling radio bearer between the second network device and the UE.

With reference to the second aspect, in a possible implementation of the second aspect, the UE may determine the integrity protection parameters and the integrity protection algorithm in a message sent by a first network device, and a specific implementation is as follows:

receiving, by the UE, a security activation command sent by the first network device, where the security activation command includes an integrity protection algorithm used to perform integrity protection on a signaling radio bearer between the first network device and the UE, and is used to activate performing integrity protection on the signaling radio bearer between the first network device and the UE;

generating, by the UE, a root key based on the security activation command;

receiving, by the UE, a Radio Resource Control RRC connection reconfiguration message sent by the first network device, obtaining the identifier of the signaling radio bearer between the user equipment and the second network device, a first random number, and the integrity protection algorithm from the RRC connection reconfiguration message, and establishing the signaling radio bearer between the UE and the second network device, where the first random number is generated by the second network device, and the integrity protection algorithm is selected by the second network device from at least one integrity protection algorithm that the UE can support;

generating, by the UE, a first key based on the root key; and generating, by the UE, a second key based on the first random number and the first key, and generating, based on the second key, the third key that is used to perform integrity protection on the signaling radio bearer between the second network device and the UE.

With reference to the second aspect, in another possible implementation of the second aspect, the UE may directly determine the integrity protection parameters and the integrity protection algorithm in a message sent by the second network device, and a specific implementation is as follows:

receiving, by the UE, a security activation command sent by the first network device, where the security activation command includes an integrity protection algorithm used to perform integrity protection on a signaling radio bearer between the first network device and the UE, and is used to activate performing integrity protection on the signaling radio bearer between the first network device and the UE;

generating, by the UE, a root key based on the security activation command;

receiving, by the UE, a Radio Resource Control RRC connection reconfiguration message sent by the first network device, and obtaining the identifier of the signaling radio bearer between the second network device and the UE from the RRC connection reconfiguration message;

receiving, by the UE, a security activation message sent by the second network device, and obtaining a first random number and the integrity protection algorithm from the security activation message, where the first random number is generated by the second network device, and the integrity protection algorithm is selected by the second network device from at least one integrity protection algorithm that the UE can support;

generating, by the UE, a first key based on the root key; and generating, by the UE, a second key based on the first random number and the first key, and generating, based on the second key, the third key that is used to perform integrity protection on the signaling radio bearer between the second network device and the UE.

In some embodiments, in the foregoing two manners, the generating, by the UE, a first key based on the root key may include:

generating, by the UE, the first key based on a cell identifier of a primary serving cell, of the UE, operated by the second network device, a carrier frequency of the primary serving cell, and the root key.

Therefore, the UE may obtain, from the first network device or the second network device, a random number that is used to derive a key required for performing integrity protection between the DU and the UE, the identifier of the signaling radio bearer, and the determined integrity protection algorithm.

Further, similar to the first aspect, in some cases (for example, the following case 1 or 2), a key required for performing integrity protection between the DU and the UE is updated: Case 1: The root key is changed. Case 2: Key update is required between the DU and the UE. For example, a random number is changed. In this case, regardless of a case in which key update occurs, both the DU and the UE need to simultaneously perform key change based on an update status, to avoid an integrity protection failure caused by inconsistent integrity protection parameters required when integrity protection is performed.

Specifically, with reference to the second aspect or any possible implementation of the second aspect, in still another possible implementation of the second aspect, if the root key is changed, the method may further include:

generating, by the UE, a new root key;

receiving, by the UE, a key modification request message sent by the second network device, where the key modification request message includes a second random number;

generating, by the UE, a new first key based on the new root key;

generating, by the UE, a new second key based on the second random number and the new first key, and generating, based on the new second key, a new third key that is used to perform integrity protection on the signaling radio bearer between the second network device and the UE; and returning, by the UE, a key modification response message to the second network device.

With reference to the second aspect or any possible implementation of the second aspect, in yet another possible implementation of the second aspect, the method may further include:

receiving, by the UE, a key modification request message sent by the second network device, where the key modification request message includes a third random number;

generating, by the UE, a new second key based on the third random number and the first key, and generating, based on the new second key, a new third key that is used to perform integrity protection on the signaling radio bearer between the second network device and the UE; and returning, by the UE, a key modification response message to the second network device.

Therefore, when a key is changed, two ends, namely, the DU and the UE update, in time, a key required for performing integrity protection, to avoid a problem of an integrity protection failure.

A third aspect provides a control signaling processing method, performed by a first network device. The method may include:

obtaining, by the first network device, context information of UE including: a root key, and at least one integrity protection algorithm that the UE can support; sending a security activation command to the UE, where the security activation command includes an integrity protection algorithm used to perform integrity protection on a signaling radio bearer between the first network device and the UE, and is used to activate performing integrity protection on the signaling radio bearer between the first network device and the UE; sending, to a second network device, a signaling radio bearer establishment request that is used to request the second network device to establish a signaling radio bearer between the second network device and the UE; receiving a signaling radio bearer establishment response message returned by the second network device; sending, to the UE, a Radio Resource Control RRC connection reconfiguration message used to establish the signaling radio bearer between the second network device and the UE; and receiving an RRC connection reconfiguration success message returned by the UE.

Therefore, the first network device may send, to the UE and the second network device, a key from which the integrity protection parameters required for integrity protection are derived, and a plurality of optional integrity protection algorithms, so that the UE and the second network device may determine, based on the key and the plurality of integrity protection algorithms that are received, integrity protection parameters and an integrity protection algorithm that are finally required for performing integrity protection, to implement an integrity protection function between the second network device and the UE.

With reference to the third aspect, in a possible implementation of the third aspect, the method may further include:

before the sending, by the first network device, a signaling radio bearer establishment request to a second network device, generating, by the first network device, a first key based on the root key; and in the implementation, the signaling radio bearer establishment request includes: the first key and the at least one integrity protection algorithm that the UE can support; and the signaling radio bearer establishment response message and the RRC connection reconfiguration message include: a first random number, an identifier of the signaling radio bearer, and the integrity protection algorithm.

With reference to the third aspect, in a possible implementation of the third aspect, the method may further include:

after the receiving, by the first network device, an RRC connection reconfiguration success message returned by the UE, generating, by the first network device, a first key based on the root key;

sending, by the first network device, a security context establishment request message to the second network device, where the security context establishment request message includes: the first key and the at least one integrity protection algorithm that the UE can support; and receiving, by the first network device, a security context establishment response message returned by the second network device.

In the possible implementation, the signaling radio bearer establishment response message and the RRC connection reconfiguration message include an identifier of the signaling radio bearer.

In some embodiments, in the foregoing two possible implementations, the generating, by the first network device, a first key based on the root key may include:

generating, by the first network device, the first key based on a cell identifier of a primary serving cell, of the UE, operated by the second network device, a carrier frequency of the primary serving cell, and the root key.

Therefore, the first network device may generate, based on the root key, the first key used to derive a key required for performing integrity protection between the second network device and the UE.

A fourth aspect provides an integrity protection algorithm. The method may be applied to an access network architecture including a first network device and a second network device, the first network device may be connected to a plurality of second network devices, the second network device may be connected to a plurality of user equipments UEs, the method is performed by the second network device, the second network device may include a first protocol layer entity, and the method may include:

generating, by the first protocol layer entity of the second network device, control signaling between the second network device and UE; determining, by the first protocol layer entity of the second network device, integrity protection parameters and an integrity protection algorithm that are used to perform integrity protection on the control signaling, and determining a message authentication code MAC-I based on the integrity protection parameters and the integrity protection algorithm; and sending, by the first protocol layer entity of the second network device, to the UE, the control signaling carrying the MAC-I.

The first network device may be a central unit located in a central equipment room, such as a baseband unit, the second network device may be a distributed unit relatively close to the UE, such as a remote radio unit, and the first protocol layer entity is a Radio Link Control RLC layer or a Media Access Control MAC layer.

Therefore, the second network device may exchange the control signaling between the second network device and the UE by using any protocol layer in a Layer 2 protocol stack in an original control protocol stack of the second network device, and perform integrity protection on the control signaling. When the first network device is a CU, and the second network device is a DU, a function of performing, by the DU, integrity protection on the control signaling exchanged between the DU and the UE in a CU-DU separated access network architecture is implemented.

In some embodiments, the integrity protection parameters may include but are not limited to: a BEARER parameter value, a count, and a third key used to perform integrity protection between the second network device and the UE.

With reference to the fourth aspect, in a possible implementation of the fourth aspect, the integrity protection parameters and the integrity protection algorithm may be obtained in the following manner:

receiving, by the first protocol layer entity of the second network device, a security context establishment request message that is sent by the first network device and that includes a first key and at least one integrity protection algorithm that the UE can support;

generating, by the first protocol layer entity of the second network device, a first random number;

generating, by the first protocol layer entity of the second network device, a second key based on the first random number and the first key, and generating, based on the second key, the third key that is used to perform integrity protection between the second network device and the UE; and determining, by the first protocol layer entity of the second network device, the integrity protection algorithm in the at least one integrity protection algorithm that the UE can support.

The first key is generated by the first network device based on a cell identifier of a primary serving cell, of the UE, operated by the second network device, a carrier frequency of the primary serving cell, and a root key; and the root key can be used to generate a key used to perform integrity protection on control signaling between a CU and the UE.

Therefore, the second network device may obtain the integrity protection parameters and the integrity protection algorithm that are required for performing integrity protection.

Correspondingly, for the peer UE, the integrity protection parameters and the integrity protection algorithm are required for performing integrity check on the received control signaling. In this case, the second network device may directly send, to the UE, the integrity protection parameters and the integrity protection algorithm that are required for performing integrity protection.

Specifically, with reference to the fourth aspect or any possible implementation of the fourth aspect, in a possible implementation of the fourth aspect, the method may further include:

returning, by the first protocol layer entity of the second network device, a security context establishment response message to the first network device; and sending, by the first protocol layer entity of the second network device, a security activation message including: the first random number, the BEARER parameter value, and the integrity protection algorithm to the UE.

Further, in some cases (for example, the following case 1 or 2), a key required for performing integrity protection between the DU and the UE is updated: Case 1: The root key is changed. Case 2: Key update is required between the DU and the UE. For example, a random number is changed. In this case, regardless of a case in which key update occurs, both the DU and the UE need to simultaneously perform key change based on an update status, to avoid an integrity protection failure caused by inconsistent integrity protection parameters required when integrity protection is performed.

Specifically, with reference to the fourth aspect or any possible implementation of the fourth aspect, in another possible implementation of the fourth aspect, the method may further include:

receiving, by the first protocol layer entity of the second network device, a key update request message sent by the first network device, where the key update request message includes a new first key generated based on the changed root key;

generating, by the first protocol layer entity of the second network device, a second random number;

sending, by the first protocol layer entity of the second network device, a key modification request message to the UE, where the key modification request message includes the second random number; and receiving, by the first protocol layer entity of the second network device, a key modification response message returned by the UE.

With reference to the fourth aspect or any possible implementation of the fourth aspect, in yet another possible implementation of the fourth aspect, the method may further include:

generating, by the first protocol layer entity of the second network device, a third random number;

sending, by the first protocol layer entity of the second network device, a key modification request message to the UE, where the key modification request message includes the third random number; and receiving, by the first protocol layer entity of the second network device, a key modification response message returned by the UE.

Therefore, when a key is changed, two ends, namely, the DU and the UE update, in time, a key required for performing integrity protection, to avoid a problem of an integrity protection failure.

A fifth aspect provides a control signaling processing method, performed by user equipment UE. The method may include:

determining, by the UE, integrity protection parameters and an integrity protection algorithm that are used to perform integrity protection on control signaling transmitted between a second network device and the UE, and receiving control signaling that carries a message authentication code MAC-I and that is sent by a first protocol layer entity of the second network device; and performing, by the UE, integrity check on the control signaling based on the integrity protection parameters and the integrity protection algorithm.

The performing, by the UE, integrity check on the control signaling based on the integrity protection parameters and the integrity protection algorithm may include:

obtaining, by the UE, a MAC-I based on the integrity protection parameters and the integrity protection algorithm, comparing the obtained MAC-I with the MAC-I in the received control signaling, where if the two are the same, it indicates that integrity check succeeds, or if the two are different, it indicates that integrity check fails.

Therefore, the UE may perform, by using the integrity protection parameters and the integrity protection algorithm that are obtained, integrity protection check on the received control signaling sent by the DU, to implement integrity protection on the control signaling between the UE and the DU.

In some embodiments, the integrity protection parameters may include but are not limited to: a BEARER parameter value, a count, and a third key used to perform integrity protection between the second network device and the UE.

With reference to the fifth aspect, in a possible implementation of the fifth aspect, the UE may determine the integrity protection parameters and the integrity protection algorithm in a message sent by the second network device, and a specific implementation is as follows:

receiving, by the UE, a security activation command sent by the first network device, where the security activation command includes an integrity protection algorithm used to perform integrity protection on a signaling radio bearer between the first network device and the UE, and is used to activate performing integrity protection on the signaling radio bearer between the first network device and the UE;

generating, by the UE, a root key based on the security activation command;

receiving, by the UE, a security activation message sent by the second network device, and obtaining a first random number, the BEARER parameter value and the integrity protection algorithm from the security activation message, where the first random number is generated by the second network device, and the integrity protection algorithm is selected by the second network device from at least one integrity protection algorithm that the UE can support;

generating, by the UE, a first key based on the root key; and generating, by the UE, a second key based on the first random number and the first key, and generating, based on the second key, the third key that is used to perform integrity protection on the signaling radio bearer between the second network device and the UE.

In some embodiments, in the foregoing manner, the generating, by the UE, a first key based on the root key may include:

generating, by the UE, the first key based on a cell identifier of a primary serving cell, of the UE, operated by the second network device, a carrier frequency of the primary serving cell, and the root key.

Therefore, the UE may obtain, from the second network device, a random number that is used to derive a key required for performing integrity protection between the DU and the UE, the identifier of the signaling radio bearer, and the determined integrity protection algorithm.

Further, similar to the first aspect, in some cases (for example, the following case 1 or 2), a key required for performing integrity protection between the DU and the UE is updated: Case 1: The root key is changed. Case 2: Key update is required between the DU and the UE. For example, a random number is changed. In this case, regardless of a case in which key update occurs, both the DU and the UE need to simultaneously perform key change based on an update status, to avoid an integrity protection failure caused by inconsistent integrity protection parameters required when integrity protection is performed.

Specifically, with reference to the fifth aspect or any possible implementation of the fifth aspect, in still another possible implementation of the fifth aspect, the method may further include:

generating, by the UE, a new root password;

receiving, by the UE, a key modification request message sent by the second network device, where the key modification request message includes a second random number;

generating, by the UE, a new first key based on the new root key;

generating, by the UE, a new second key based on the second random number and the new first key, and generating, based on the new second key, a new third key that is used to perform integrity protection on the signaling radio bearer between the second network device and the UE; and returning, by the UE, a key modification response message to the second network device.

With reference to the fifth aspect or any possible implementation of the fifth aspect, in yet another possible implementation of the fifth aspect, the method may further include:

receiving, by the UE, a key modification request message sent by the second network device, where the key modification request message includes a third random number;

generating, by the UE, a new second key based on the third random number and the first key, and generating, based on the new second key, a new third key that is used to perform integrity protection on the signaling radio bearer between the second network device and the UE; and returning, by the UE, a key modification response message to the second network device.

Therefore, when a key is changed, two ends, namely, the DU and the UE update, in time, a key required for performing integrity protection, to avoid a problem of an integrity protection failure.

A sixth aspect provides a control signaling processing method, performed by a first network device. The method may include:

obtaining, by the first network device, context information of UE including: a root key, and at least one integrity protection algorithm that the UE can support; sending a security activation command to the UE, where the security activation command includes an integrity protection algorithm used to perform integrity protection on a signaling radio bearer between the first network device and the UE, and is used to activate performing integrity protection on the signaling radio bearer between the first network device and the UE; generating a first key based on the root key; sending, to the second network device, a security context establishment request message that includes the first key and the at least one integrity protection algorithm that the UE can support; and receiving, by the first network device, a security context establishment response message returned by the second network device.

Therefore, the first network device may send, to the UE and the second network device, a key from which the integrity protection parameters required for integrity protection are derived, and a plurality of optional integrity protection algorithms, so that the UE and the second network device may determine, based on the key and the plurality of integrity protection algorithms that are received, integrity protection parameters and an integrity protection algorithm that are finally required for performing integrity protection, to implement an integrity protection function between the second network device and the UE.

With reference to the sixth aspect, in a possible implementation of the sixth aspect, the generating, by the first network device, a first key based on the root key may include:

generating, by the first network device, the first key based on a cell identifier of a primary serving cell, of the UE, operated by the second network device, a carrier frequency of the primary serving cell, and the root key.

Therefore, the first network device may generate, based on the root key, the first key used to derive a key required for performing integrity protection between the second network device and the UE.

According to a seventh aspect, the present invention provides a second network device. The second network device may include a first protocol layer entity and a second protocol layer entity, and the device includes:

an establishment unit, configured to establish a signaling radio bearer between the establishment unit and user equipment UE, where the signaling radio bearer is used to transmit control signaling between the second network device and the UE, a first determining unit, configured to determine integrity protection parameters and an integrity protection algorithm that are used to perform integrity protection on the control signaling, where the first determining unit is located in the first protocol layer entity;

a second determining unit, configured to determine a message authentication code MAC-I based on the integrity protection parameters and the integrity protection algorithm, where the second determining unit is located in the second protocol layer entity;

a receiving unit, configured to receive control signaling sent by the first protocol layer entity of the second network device; and a sending unit, configured to send, to the UE, the control signaling carrying the MAC-I.

For a specific implementation of the seventh aspect, refer to a behavior function of the second network device in the control signaling processing method according to the first aspect or a possible implementation of the first aspect. Details are not repeated herein. Therefore, the second network device according to the seventh aspect may achieve a beneficial effect the same as that achieved according to the first aspect.

According to an eighth aspect, the present invention provides a second network device. The second network device may include a first protocol layer entity and a second protocol layer entity, and the device establishes a signaling radio bearer between the device and user equipment UE, where the signaling radio bearer is used to transmit control signaling between the second network device and the UE; and the device includes:

a processor, configured to determine integrity protection parameters and an integrity protection algorithm that are used to perform integrity protection on the control signaling, where the first determining unit is located in the first protocol layer entity; and determine a message authentication code MAC-I based on the integrity protection parameters and the integrity protection algorithm, where the second determining unit is located in the second protocol layer entity; and a transceiver, configured to receive control signaling sent by the first protocol layer entity of the second network device; and send, to the UE, the control signaling carrying the MAC-I.

For a specific implementation of the eighth aspect, refer to a behavior function of the second network device in the control signaling processing method according to the first aspect or a possible implementation of the first aspect. Details are not repeated herein. Therefore, the second network device according to the eighth aspect may achieve a beneficial effect the same as that achieved according to the first aspect.

According to a ninth aspect, the present invention provides a non-volatile computer readable storage medium storing one or more programs, the one or more programs include instructions, and when the instructions are executed by the second network device according to the seventh aspect, the eighth aspect, or any one of the foregoing possible implementations, the second network device is enabled to perform the following events:

establishing, between the second network device and user equipment UE, a signaling radio bearer used to transmit control signaling between the second network device and the UE; determining integrity protection parameters and an integrity protection algorithm that are used to perform integrity protection on the control signaling, where the first determining unit is located in the first protocol layer entity; determining a message authentication code MAC-I based on the integrity protection parameters and the integrity protection algorithm, where the second determining unit is located in the second protocol layer entity; receiving control signaling sent by the first protocol layer entity of the second network device; and sending, to the UE, the control signaling carrying the MAC-I.

For a specific implementation of the ninth aspect, refer to a behavior function of the second network device in the control signaling processing method according to the first aspect or a possible implementation of the first aspect. Details are not repeated herein. Therefore, the second network device according to the ninth aspect may achieve a beneficial effect the same as that achieved according to the first aspect.

A tenth aspect provides UE. The UE may include:

an establishment unit, configured to establish a signaling radio bearer between the establishment unit and a second network device, and transmit control signaling between the UE and the second network device through the signaling radio bearer, where a determining unit, configured to determine integrity protection parameters and an integrity protection algorithm that are used to perform integrity protection on the control signaling;

a receiving unit, configured to receive control signaling that carries a message authentication code MAC-I and that is sent by a second protocol layer entity of the second network device; and a check unit, configured to perform integrity check on the control signaling based on the integrity protection parameters and the integrity protection algorithm that are determined by the determining unit.

For a specific implementation of the tenth aspect, refer to a behavior function of the UE in the control signaling processing method according to the second aspect or a possible implementation of the second aspect. Details are not repeated herein. Therefore, the UE according to the tenth aspect may achieve a beneficial effect the same as that achieved according to the second aspect.

An eleventh aspect provides UE. The UE establishes a signaling radio bearer between the UE and a second network device, and transmits control signaling between the UE and the second network device through the signaling radio bearer, and the UE may include:

a processor, configured to determine integrity protection parameters and an integrity protection algorithm that are used to perform integrity protection on the control signaling; and a transceiver, configured to receive control signaling that carries a message authentication code MAC-I and that is sent by a second protocol layer entity of the second network device, where the processor is further configured to perform integrity check on the control signaling based on the integrity protection parameters and the integrity protection algorithm that are determined by the processor.

For a specific implementation of the eleventh aspect, refer to a behavior function of the UE in the control signaling processing method according to the second aspect or a possible implementation of the second aspect. Details are not repeated herein. Therefore, the UE according to the eleventh aspect may achieve a beneficial effect the same as that achieved according to the second aspect.

According to a twelfth aspect, the present invention provides a non-volatile computer readable storage medium storing one or more programs, the one or more programs include instructions, and when the instructions are executed by the UE according to the tenth aspect, the eleventh aspect, or any one of the foregoing possible implementations, the UE is enabled to perform the following events:

establishing a signaling radio bearer between the UE and a second network device, and transmitting control signaling between the UE and the second network device through the signaling radio bearer; determining integrity protection parameters and an integrity protection algorithm that are used to perform integrity protection on the control signaling; receiving control signaling that carries a message authentication code MAC-I and that is sent by a second protocol layer entity of the second network device; and performing integrity check on the control signaling based on the integrity protection parameters and the integrity protection algorithm that are determined by the determining unit.

For a specific implementation of the twelfth aspect, refer to a behavior function of the UE in the control signaling processing method according to the second aspect or a possible implementation of the second aspect. Details are not repeated herein. Therefore, the UE according to the twelfth aspect may achieve a beneficial effect the same as that achieved according to the second aspect.

A thirteenth aspect provides a first network device. The first network device may include:

an obtaining unit, configured to obtain context information of UE, where the context information includes: a root key, and at least one integrity protection algorithm that the UE can support;

a sending unit, configured to send a security activation command to the UE, where the security activation command includes an integrity protection algorithm used to perform integrity protection on a signaling radio bearer between the first network device and the UE, and is used to activate performing integrity protection on the signaling radio bearer between the first network device and the UE, where the sending unit is further configured to send, to a second network device, a signaling radio bearer establishment request, where the signaling radio bearer establishment request is used to request the second network device to establish a signaling radio bearer between the second network device and the UE; and a receiving unit, configured to receive a signaling radio bearer establishment response message returned by the second network device, where the sending unit is further configured to send, to the UE, a Radio Resource Control RRC connection reconfiguration message used to establish the signaling radio bearer between the second network device and the UE; and the receiving unit is further configured to receive an RRC connection reconfiguration success message returned by the UE.

For a specific implementation of the thirteenth aspect, refer to a behavior function of the first network device in the control signaling processing method according to the third aspect or a possible implementation of the third aspect. Details are not repeated herein. Therefore, the first network device according to the thirteenth aspect may achieve a beneficial effect the same as that achieved according to the third aspect.

A fourteenth aspect provides a first network device. The first network device may include:

a processor, configured to obtain context information of UE including: a root key, and at least one integrity protection algorithm that the UE can support; and a transceiver, configured to send a security activation command to the UE, where the security activation command includes an integrity protection algorithm used to perform integrity protection on a signaling radio bearer between the first network device and the UE, and is used to activate performing integrity protection on the signaling radio bearer between the first network device and the UE;

send, to a second network device, a signaling radio bearer establishment request, where the signaling radio bearer establishment request is used to request the second network device to establish a signaling radio bearer between the second network device and the UE;

receive a signaling radio bearer establishment response message returned by the second network device;

send, to the UE, a Radio Resource Control RRC connection reconfiguration message used to establish the signaling radio bearer between the second network device and the UE; and receive an RRC connection reconfiguration success message returned by the UE.

For a specific implementation of the fourteenth aspect, refer to a behavior function of the first network device in the control signaling processing method according to the third aspect or a possible implementation of the third aspect. Details are not repeated herein. Therefore, the first network device according to the fourteenth aspect may achieve a beneficial effect the same as that achieved according to the third aspect.

According to a fifteenth aspect, the present invention provides a non-volatile computer readable storage medium storing one or more programs, the one or more programs include instructions, and when the instructions are executed by the first network device according to the thirteenth aspect, the fourteenth aspect, or any one of the foregoing possible implementations, the first network device is enabled to perform the following events:

obtaining context information of UE including: a root key, and at least one integrity protection algorithm that the UE can support; sending a security activation command to the UE, where the security activation command includes an integrity protection algorithm used to perform integrity protection on a signaling radio bearer between the first network device and the UE, and is used to activate performing integrity protection on the signaling radio bearer between the first network device and the UE; sending, to a second network device, a signaling radio bearer establishment request that is used to request the second network device to establish a signaling radio bearer between the second network device and the UE; receiving a signaling radio bearer establishment response message returned by the second network device; sending, to the UE, a Radio Resource Control RRC connection reconfiguration message used to establish the signaling radio bearer between the second network device and the UE; and receiving an RRC connection reconfiguration success message returned by the UE.

For a specific implementation of the fifteenth aspect, refer to a behavior function of the first network device in the control signaling processing method according to the third aspect or a possible implementation of the third aspect. Details are not repeated herein. Therefore, the first network device according to the fifteenth aspect may achieve a beneficial effect the same as that achieved according to the third aspect.

A sixteenth aspect provides a second network device. The second network device includes a first protocol layer entity, and the first protocol layer entity of the second network device includes:

a generation unit, configured to generate control signaling between the second network device and UE;

a determining unit, configured to determine integrity protection parameters and an integrity protection algorithm, where the integrity protection parameters and the integrity protection algorithm are used to perform integrity protection on the control signaling; and determine a message authentication code MAC-I based on the integrity protection parameters and the integrity protection algorithm; and a sending unit, configured to send, to the UE, the control signaling carrying the MAC-I.

For a specific implementation of the sixteenth aspect, refer to a behavior function of the second network device in the control signaling processing method according to the fourth aspect or a possible implementation of the fourth aspect. Details are not repeated herein. Therefore, the second network device according to the sixteenth aspect may achieve a beneficial effect the same as that achieved according to the fourth aspect.

A seventeenth aspect provides a second network device. The second network device includes a first protocol layer entity, and the first protocol layer entity of the second network device includes:

a processor, configured to generate control signaling between the second network device and UE; and determine integrity protection parameters and an integrity protection algorithm, where the integrity protection parameters and the integrity protection algorithm are used to perform integrity protection on the control signaling; and determine a message authentication code MAC-I based on the integrity protection parameters and the integrity protection algorithm; and a transceiver, configured to send, to the UE, the control signaling carrying the MAC-I.

For a specific implementation of the seventeenth aspect, refer to a behavior function of the second network device in the control signaling processing method according to the fourth aspect or a possible implementation of the fourth aspect. Details are not repeated herein. Therefore, the second network device according to the seventeenth aspect may achieve a beneficial effect the same as that achieved according to the fourth aspect.

An eighteenth aspect provides a non-volatile computer readable storage medium storing one or more programs, the one or more programs include instructions, and when the instructions are executed by the first network device according to the sixteenth aspect, the seventeenth aspect, or any one of the foregoing possible implementations, the first network device is enabled to perform the following events:

generating control signaling between the second network device and UE; determining integrity protection parameters and an integrity protection algorithm that are used to perform integrity protection on the control signaling; determining a message authentication code MAC-I based on the integrity protection parameters and the integrity protection algorithm; and sending, to the UE, the control signaling carrying the MAC-I.

For a specific implementation of the eighteenth aspect, refer to a behavior function of the second network device in the control signaling processing method according to the fourth aspect or a possible implementation of the fourth aspect. Details are not repeated herein. Therefore, the second network device according to the eighteenth aspect may achieve a beneficial effect the same as that achieved according to the fourth aspect.

A nineteenth aspect provides user equipment UE. The UE may include:

a determining unit, configured to determine integrity protection parameters and an integrity protection algorithm, where the integrity protection parameters and the integrity protection algorithm are used to perform integrity protection on control signaling transmitted between a second network device and the UE;

a receiving unit, configured to receive control signaling that carries a message authentication code MAC-I and that is sent by a first protocol layer entity of the second network device; and a check unit, configured to perform integrity check on the control signaling based on the integrity protection parameters and the integrity protection algorithm.

For a specific implementation of the nineteenth aspect, refer to a behavior function of the UE in the control signaling processing method according to the fifth aspect or a possible implementation of the fifth aspect. Details are not repeated herein. Therefore, the UE according to the nineteenth aspect may achieve a beneficial effect the same as that achieved according to the fifth aspect.

A twentieth aspect provides user equipment UE. The UE may include:

a processor, configured to determine integrity protection parameters and an integrity protection algorithm, where the integrity protection parameters and the integrity protection algorithm are used to perform integrity protection on control signaling transmitted between a second network device and the UE; and a transceiver, configured to receive control signaling that carries a message authentication code MAC-I and that is sent by a first protocol layer entity of the second network device, where the processor is further configured to perform integrity check on the control signaling based on the integrity protection parameters and the integrity protection algorithm.

For a specific implementation of the twentieth aspect, refer to a behavior function of the UE in the control signaling processing method according to the fifth aspect or a possible implementation of the fifth aspect. Details are not repeated herein. Therefore, the UE according to the twentieth aspect may achieve a beneficial effect the same as that achieved according to the fifth aspect.

A twenty-first aspect provides a non-volatile computer readable storage medium storing one or more programs, the one or more programs include instructions, and when the instructions are executed by the UE according to the nineteenth aspect, the twentieth aspect, or any one of the foregoing possible implementations, the UE is enabled to perform the following events:

determining integrity protection parameters and an integrity protection algorithm that are used to perform integrity protection on control signaling transmitted between a second network device and the UE; receiving control signaling that carries a message authentication code MAC-I and that is sent by a first protocol layer entity of the second network device; and performing integrity check on the control signaling based on the integrity protection parameters and the integrity protection algorithm.

For a specific implementation of the twenty-first aspect, refer to a behavior function of the UE in the control signaling processing method according to the fifth aspect or a possible implementation of the fifth aspect. Details are not repeated herein. Therefore, the UE according to the twenty-first aspect may achieve a beneficial effect the same as that achieved according to the fifth aspect.

A twenty-second aspect provides a first network device. The first network device may include:

an obtaining unit, obtaining context information of UE, where the context information includes: a root key, and at least one integrity protection algorithm that the UE can support;

a sending unit, configured to send a security activation command to the UE, where the security activation command includes an integrity protection algorithm used to perform integrity protection on a signaling radio bearer between the first network device and the UE, and is used to activate performing integrity protection on the signaling radio bearer between the first network device and the UE;

a generation unit, configured to generate a first key based on the root key, where the sending unit is further configured to send a security context establishment request message to the second network device, where the security context establishment request message includes: the first key and the at least one integrity protection algorithm that the UE can support; and a receiving unit, configured to receive a security context establishment response message returned by the second network device.

For a specific implementation of the twenty-second aspect, refer to a behavior function of the first network device in the control signaling processing method according to the sixth aspect or a possible implementation of the sixth aspect. Details are not repeated herein. Therefore, the first network device according to the twenty-second aspect may achieve a beneficial effect the same as that achieved according to the sixth aspect.

A twenty-third aspect provides a first network device. The first network device may include:

a processor, configured to obtain context information of UE including: a root key, and at least one integrity protection algorithm that the UE can support; and a transceiver, configured to send a security activation command to the UE, where the security activation command includes an integrity protection algorithm used to perform integrity protection on a signaling radio bearer between the first network device and the UE, and is used to activate performing integrity protection on the signaling radio bearer between the first network device and the UE, where the processor is further configured to generate a first key based on the root key; and the transceiver is further configured to send a security context establishment request message to the second network device, where the security context establishment request message includes: the first key and the at least one integrity protection algorithm that the UE can support; and receive a security context establishment response message returned by the second network device.

For a specific implementation of the twenty-third aspect, refer to a behavior function of the first network device in the control signaling processing method according to the sixth aspect or a possible implementation of the sixth aspect. Details are not repeated herein. Therefore, the first network device according to the twenty-third aspect may achieve a beneficial effect the same as that achieved according to the sixth aspect.

A twenty-fourth aspect provides a non-volatile computer readable storage medium storing one or more programs, the one or more programs include instructions, and when the instructions are executed by the first network device according to the twenty-second aspect, the twenty-third aspect, or any one of the foregoing possible implementations, the first network device is enabled to perform the following events:

obtaining context information of UE including: a root key, and at least one integrity protection algorithm that the UE can support; sending a security activation command to the UE, where the security activation command includes an integrity protection algorithm used to perform integrity protection on a signaling radio bearer between the first network device and the UE, and is used to activate performing integrity protection on the signaling radio bearer between the first network device and the UE; generating a first key based on the root key; sending, to the second network device, a security context establishment request message that includes the first key and the at least one integrity protection algorithm that the UE can support; and receiving a security context establishment response message returned by the second network device.

For a specific implementation of the twenty-fourth aspect, refer to a behavior function of the first network device in the control signaling processing method according to the sixth aspect or a possible implementation of the sixth aspect. Details are not repeated herein. Therefore, the first network device according to the twenty-fourth aspect may achieve a beneficial effect the same as that achieved according to the sixth aspect.

A twenty-fifth aspect provides a control signaling processing system, including: the second network device according to the seventh aspect, the eighth aspect, the ninth aspect, or any one of the foregoing possible implementations, the UE according to the tenth aspect, the eleventh aspect, the twelfth aspect, or any one of the foregoing possible implementations, and the first network device according to the thirteenth aspect, the fourteenth aspect, the fifteenth aspect, or any one of the foregoing possible implementations; or the second network device according to the sixteenth aspect, the seventeenth aspect, the eighteenth aspect, or any one of the foregoing possible implementations, the UE according to the nineteenth aspect, the twentieth aspect, the twenty-first aspect, or any one of the foregoing possible implementations, and the first network device according to the twenty-second aspect, the twenty-third aspect, the twenty-fourth aspect, or any one of the foregoing possible implementations.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
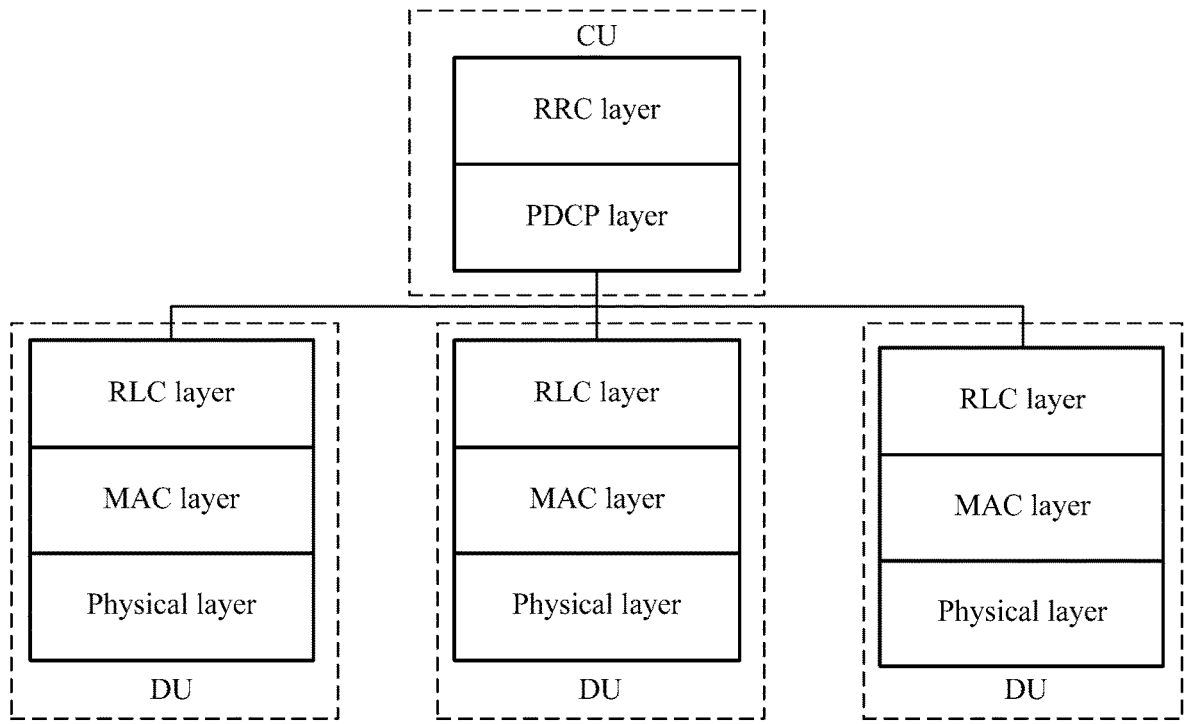
FIG. 1 is a schematic diagram of a control plane protocol stack of an existing layered access network architecture.

A principle of the present invention is: in some embodiments, an RRC layer and a PDCP layer are newly added to a control plane protocol stack of a DU, a control function of the DU is completed by the RRC layer, a signaling radio bearer is established between UE and the DU to transmit control signaling between the DU and the UE, and integrity protection on the control signaling is implemented by the PDCP layer. In some embodiments, based on a control plane protocol stack of an existing DU, a control function of the DU is implemented by any layer (for example, an RLC layer or a MAC layer) in a Layer 2 of the DU, control signaling between UE and the DU is transmitted by using a Layer 2 message, and the Layer 2 performs integrity protection on the Layer 2 message carrying the control signaling.

The following describes the technical solutions in various embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In descriptions of the present invention, it should be understood that, a system or an element indicated by terms such as "first", "second", and "another" is a system or an element that is described based on the embodiments and that has a particular function, and is used only for describing the present invention and for a brief description, but does not indicate or imply that the indicated system or element needs to have the name, and therefore should not be construed as a limitation to the present invention.

Before the solutions are described in detail, for ease of understanding the technical solutions of the present invention, some key terms in the present invention are explained in detail. It should be understood that, the following terms are named by persons skilled in the present invention merely for ease of description, and do not mean or imply that related systems or elements need to be named in this way. Therefore, these names do not constitute any limitation to the present invention.

RRC layer: Main functions include broadcast of system information, paging, establishment/release/maintenance of an RRC connection, and the like, and RRC statuses include RRC_IDLE (an idle state) and RRC_CONNECTED (a connected state).

PDCP layer: Main functions include header compression, a security function (for example, integrity protection or encryption), and supporting of reordering and retransmission during handover.

RLC layer: Main functions include segmentation and reassembly of an upper-layer data packet, to adapt a size of an upper-layer data packet obtained after segmentation and reassembly to actual transmission performed over a radio interface. For a resource block (English: Resource Block, RB) that requires error-free transmission, the RLC layer may restore a lost packet through retransmission. Additionally, the RLC layer compensates, through reordering, for out-of-order receiving generated due to a bottom-layer hybrid automatic repeat request (English: Hybrid Automatic Repeat reQuest, HARQ) operation.

MAC layer: Main functions of include mapping a logical channel to a transmission channel, multiplexing data (MAC SDUs) delivered from one or more logical channels to a transport block, and sending the data to a physical layer through the transmission channel; demultiplexing the transport block transferred from the transmission channel into the MAC SDUs, and submitting the MAC SDUs to the RLC layer through a corresponding logical channel; scheduling reporting of information; an error correction function based on an HARQ mechanism; processing priorities of different users and processing priorities of different logical channels of a same user in a dynamic scheduling manner; and selection of a transmission format, where a corresponding transmission format is selected by using measurement information, a user capability, and the like that are reported at a physical layer, thereby implementing most effective resource utilization and the like.

Physical layer: The physical layer provides a data transmission service to a higher layer through the transmission channel, and functions provided by the physical layer include: functions such as detecting an error of the transmission channel and providing an indication to the higher layer, forward error correction encoding and decoding of the transmission channel, soft combination of hybrid automatic repeat requests, speed matching between the encoded transmission channel and a physical channel, and mapping between the encoded transmission channel and the physical channel.

Figure 2:
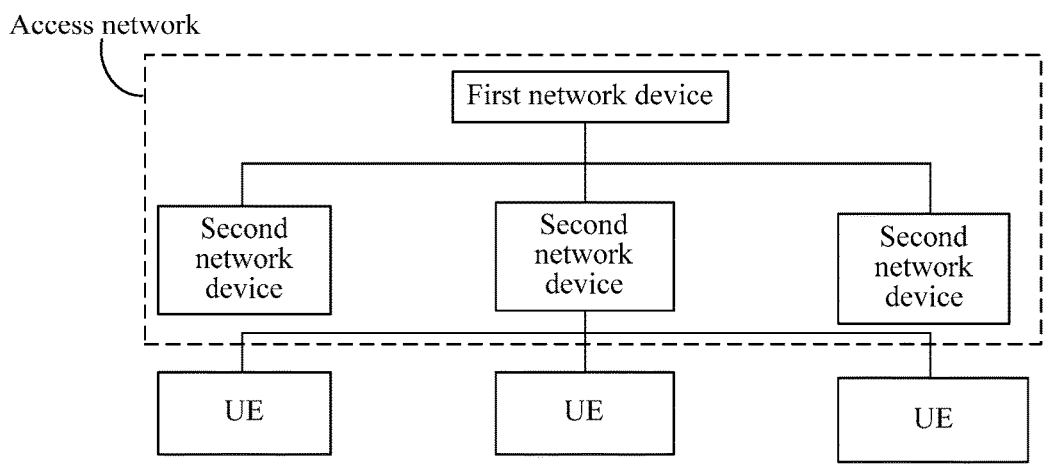
FIG. 2 is a schematic diagram of a network architecture according to an embodiment of the present invention.
Figure 3:
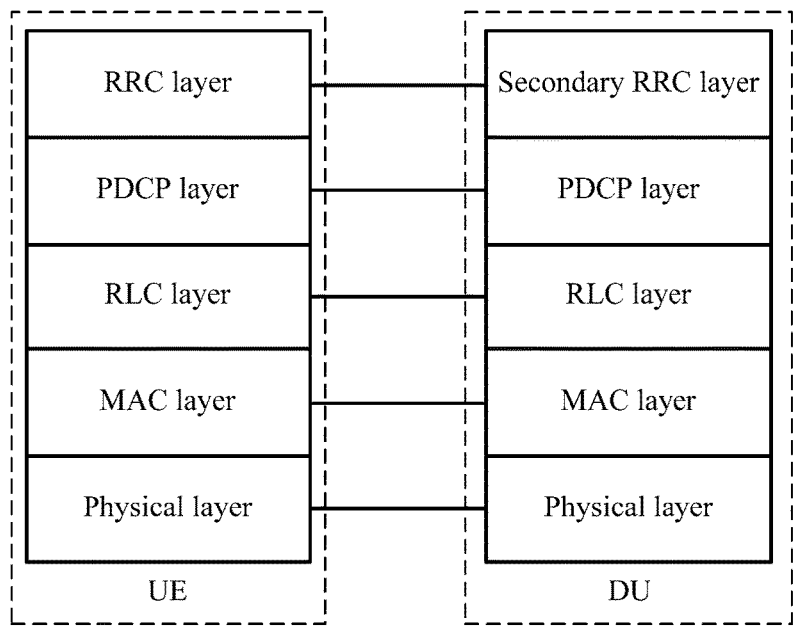
FIG. 3 is a schematic diagram of a control plane protocol stack architecture according to an embodiment of the present invention.

A control signaling processing method according to the present invention may be applied to a network architecture shown in FIG. 2, and the network architecture may be a 5G network architecture. As shown in FIG. 2, the network architecture may include: an access network and UE. The access network includes two network elements, namely, a first network device and a second network device, and is an access network architecture in which the first network device and the second network device are separated. One first network device may be connected to a plurality of second network devices, one second network device may be connected to a plurality of UEs, and the UE may perform handover between second network devices. The first network device may be a CU such as a baseband unit (English: Base band Unit, BBU), usually located in a central equipment room, and the second network device may be a DU such as a remote radio unit (English: Remote Radio Unit, RRU), relatively close to the UE. It should be noted that, FIG. 2 is only a schematic diagram, nodes shown in FIG. 3 are only an example, and a quantity of the nodes does not constitute a limitation on the solution of this application. Moreover, for convenience of description, a control signaling processing method, a device, and a system according to the present invention are described by using only an example in which the first network device is a CU and the second network device is a DU in the embodiments of the present invention.

In the currently discussed CU-DU separated access network architecture, only the CU has a control plane function, a possible control plane protocol stack of the access network is shown in FIG. 1, and the DU includes only an RLC layer, a MAC layer, and a physical layer. When some control functions need to be implemented on the DU side, because a PDCP layer for implementing an integrity protection function does not exist in the DU, integrity protection cannot be performed on control signaling exchanged between the DU and the CU.

Based on this, in an implementation solution according to the embodiments of the present invention, a first protocol layer entity and a second protocol layer entity may be included in a control plane protocol stack of the DU, the first protocol layer entity completes a control function of the DU, and delivers control signaling, and the second protocol layer entity in the DU performs integrity protection on the control signaling. The first protocol layer entity may be an RRC layer (which is also referred to as a secondary (Secondary) RRC layer) entity (which may also be referred to as an RRC layer), and the second protocol layer entity may be a PDCP layer entity (which may also be referred to as a PDCP layer). For example, FIG. 3 shows a control plane protocol stack architecture between a DU and UE according to an embodiment of the present invention. As shown in FIG. 3, the DU includes a secondary RRC layer, a PDCP layer, an RLC layer, a MAC layer, and a physical layer, and the UE includes an RRC layer, a PDCP layer, an RLC layer, a MAC layer, and a physical layer. The DU may establish a signaling radio bearer between the DU and the UE by using the secondary RRC layer, to transmit control signaling between the UE and the DU, and the secondary RRC layer generates a piece of control signaling and then submits the control signaling to the underlying PDCP layer for processing. After receiving the control signaling from the secondary RRC layer, the PDCP layer generates a message authentication code for integrity (English: Message Authentication Code for Integrity, MAC-I) based on the control signaling, and sends the MAC-I and the control signaling to the UE together. An integrity protection algorithm and some integrity protection parameters (for example, a key required for performing integrity protection between the DU and the UE) used when the PDCP layer determines the MAC-I may be obtained from the secondary RRC layer.

Figure 4A:
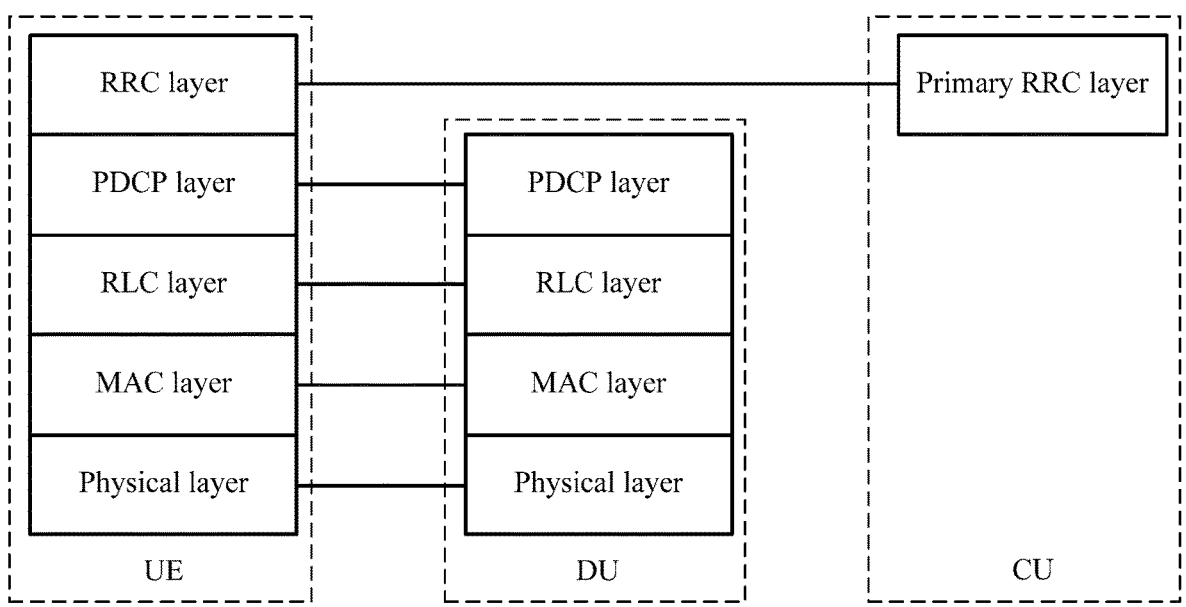
FIG. 4a is a schematic diagram of another control plane protocol architecture according to an embodiment of the present invention.
Figure 4B:
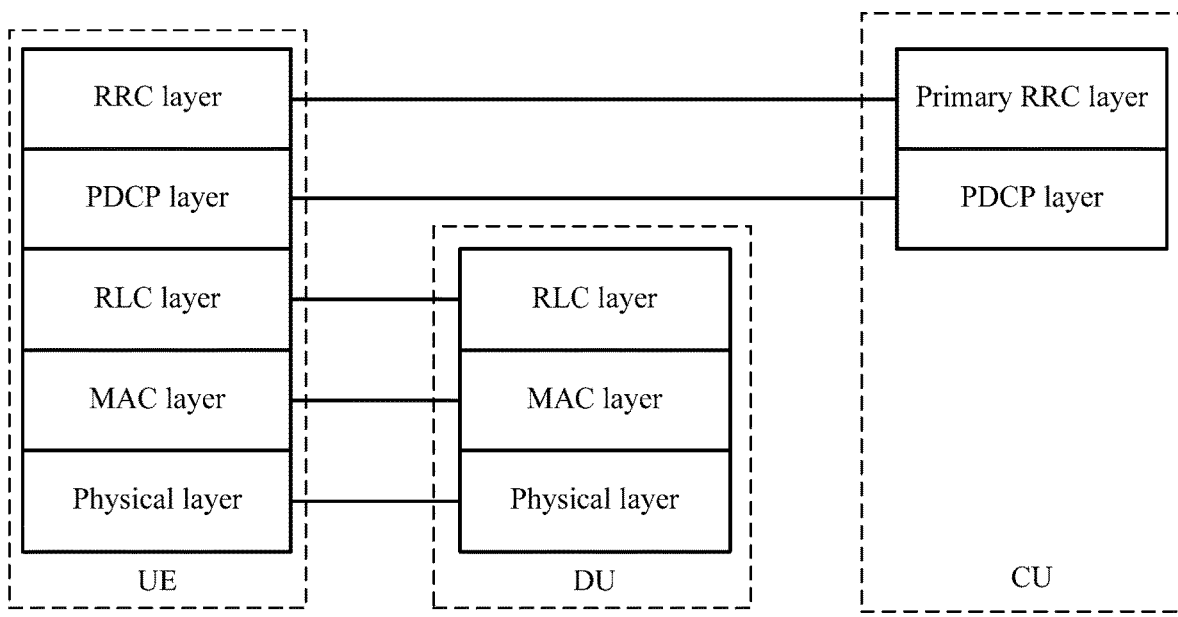
FIG. 4b is a schematic diagram of another control plane protocol architecture according to an embodiment of the present invention.

It can be learned from FIG. 3 that, to implement integrity protection on a signaling radio bearer between the DU and a CU, the DU needs to have the PDCP layer that can implement an integrity protection function. The CU implements a control function on the UE by using the DU. Therefore, in this embodiment of the present invention, for control signaling transmitted between the CU and the UE, integrity protection may be performed, by using the PDCP layer of the DU, on control signaling delivered by the CU (as shown in FIG. 4a); or integrity protection may be performed without using the PDCP layer of the DU, but instead integrity protection is performed on control signaling between the CU and the DU by using a PDCP layer of the CU (as shown in FIG. 4b).

In another implementation solution according to the embodiments of the present invention, a control function and an integrity protection function of the DU may be further implemented by using a first protocol layer entity that originally does not have a control function and that is currently included in the DU without changing an original control plane protocol stack architecture in the DU, where the first protocol layer entity may be any layer in a Layer 2. For example, based on only a control plane protocol stack architecture shown in FIG. 5, a control function of a DU is implemented by using any layer (for example, an RLC layer or a MAC layer) in a Layer 2 of the DU, and a signaling radio bearer does not need to be established between UE and the DU to transmit control signaling between the UE and the DU. Instead, the control signaling is processed by using a Layer 2 message, and the Layer 2 generates a MAC-I, and sends the MAC-I and the Layer 2 message carrying the control signaling to the UE together, thereby implementing integrity protection between the DU and the UE. An integrity protection algorithm and some integrity protection parameters (for example, a key required for performing integrity protection between the DU and the UE) used when the Layer 2 determines the MAC-I may be obtained from a CU.

To make a solution of the present invention clearer and make an objective of the present invention more definite, a control signaling processing method according to the present invention is described in detail below with reference to the network architecture shown in FIG. 2 and method flowcharts shown in FIG. 6 to FIG. 8.

Figure 6:
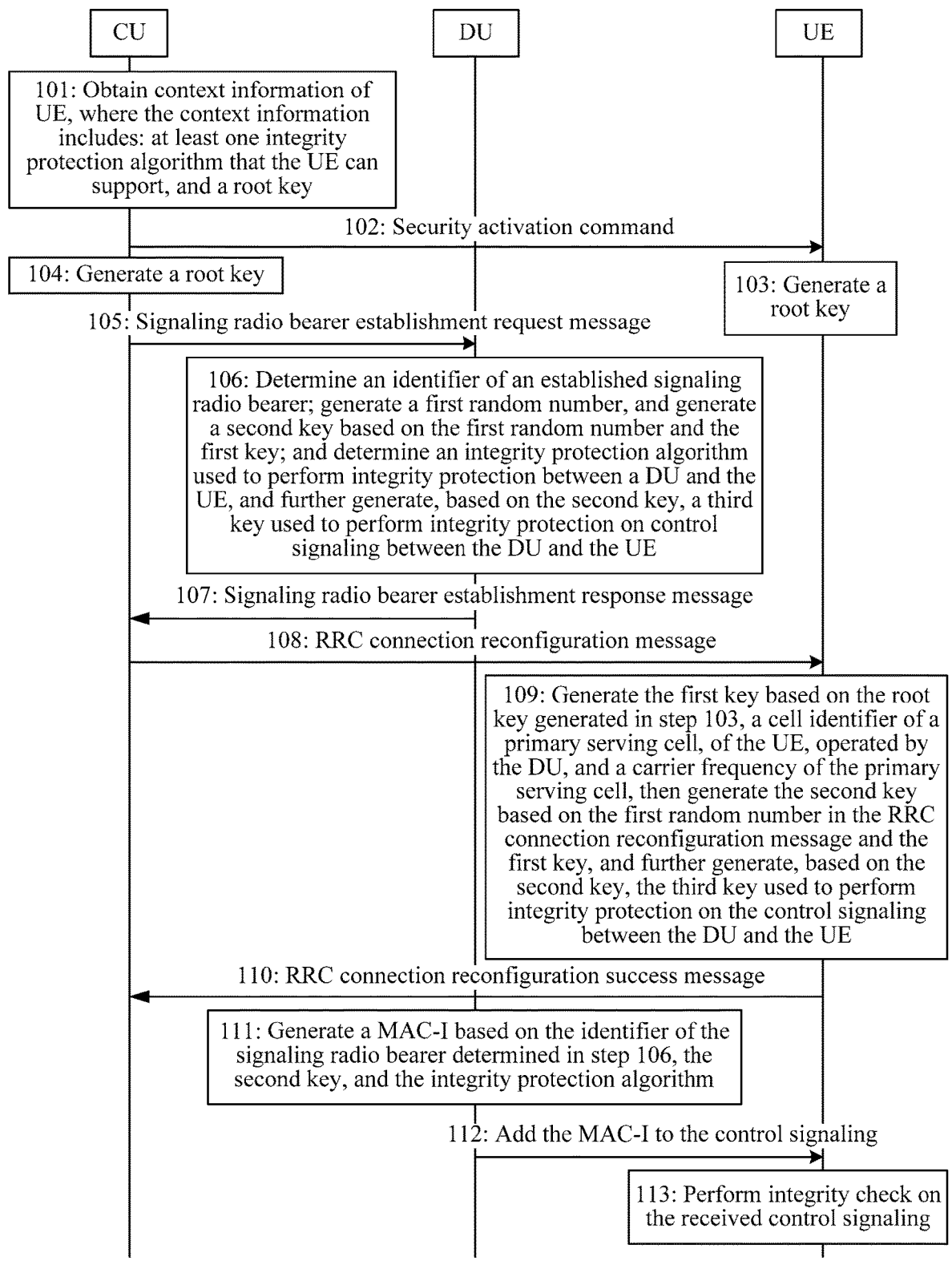
FIG. 6 is a flowchart of a control signaling processing method according to an embodiment of the present invention.

FIG. 6 is a flowchart of a control signaling processing method according to an embodiment of the present invention. The method is applied to the control plane protocol stack architecture between the DU and the UE shown in FIG. 3, and is performed through interaction between the CU, the DU, and the UE shown in FIG. 2. In the control plane protocol architecture, a control function of the DU is implemented by using an RRC layer in the DU, a signaling radio bearer is established between the UE and the DU to transmit control signaling between the UE and the DU, and integrity protection on the signaling radio bearer is implemented by a PDCP layer in the DU. As shown in FIG. 6, the method may include the following steps.

Step 101: The CU obtains context information of the UE, where the context information includes: at least one integrity protection algorithm that the UE can support, and a root key.

In some embodiments, the CU may obtain the context information of the UE from a core network (for example, a mobility management entity (English: Mobile Manager Entity, MME)).

The root key is used to generate a key used to perform integrity protection on control signaling between the CU and the UE, and the root key may be generated by a network element in the core network. In some embodiments, the root key may be generated by using a method similar to a method for generating a root key used to perform integrity protection on control signaling between UE and an eNB in a current LTE system. For example, a plurality of input parameters may be first obtained, the obtained input parameters are used as an input of a key derivation function (English: Key Derivation Function, KDF), and a root key is finally output by using the KDF. For details, refer to a root key generation method in TS33.401 v13.2.0. Details are not described herein again.

Step 102: The CU sends a security activation command to the UE, where the security activation command is used to activate an integrity protection function for a signaling radio bearer between the UE and the CU.

Step 103: The UE receives the security activation command sent by the CU, and generates a root key.

A method for generating the root key by the UE in step 103 is the same as the method for generating the root key by the network element in the core network in step 101. To be specific, a used key derivation function KDF and required input parameters in step 103 are the same as those in step 101. Therefore, the root key generated by the UE in step 103 is the same as the root key obtained by the CU from the core network.

Step 104: The CU generates a first key based on the root key obtained by the CU.

The first key is used to generate a key used to perform integrity protection on a signaling radio bearer between the DU and the UE.

In some embodiments, the CU may obtain a cell identifier of a primary serving cell, of the UE, operated by the DU, and a carrier frequency of the primary serving cell, and generate the first key based on the cell identifier of the primary serving cell, the carrier frequency of the primary serving cell, and the root key.

Step 105: The CU sends a signaling radio bearer establishment request message to the DU.

The signaling radio bearer establishment request message is used to instruct the DU to establish a signaling radio bearer between the DU and the UE, and may include the at least one integrity protection algorithm that the UE can support and that is obtained by the CU, and the first key generated by the CU in step 104.

Step 106: The DU receives the signaling radio bearer establishment request message, establishes a signaling radio bearer between the DU and the UE, and performs the following three actions:

(1) determining an identifier of the established signaling radio bearer;

(2) generating a first random number, generating a second key based on the first random number and the first key, and further generating, based on the second key, a third key used to perform integrity protection on control signaling between the DU and the UE; and (3) determining an integrity protection algorithm used to perform integrity protection between the DU and the UE.

So far, the DU has already successfully activated an integrity protection function for the signaling radio bearer between the DU and the UE.

The identifier of the signaling radio bearer is used to identify the signaling radio bearer established between the DU and the UE. It can be understood that, the DU is not limited to determining only the identifier of the signaling radio bearer, and may further determine another signaling radio bearer configuration, and details are not described herein again.

The third key is a key used to perform integrity protection on the signaling radio bearer between the DU and the UE, and is generated by using the second key in the present invention. In some embodiments, the second key and the third key may be generated with reference to the prior art. Details are not described herein again.

In some embodiments, any integrity protection algorithm may be selected from the at least one integrity protection algorithm that the UE can support to serve as an algorithm used to perform integrity protection between the DU and the UE.

Step 107: The DU returns a signaling radio bearer establishment response message to the CU.

The signaling radio bearer response message includes: the integrity protection algorithm determined by the DU, the first random number, and the identifier of the signaling radio bearer.

Step 108: The CU receives the signaling radio bearer establishment response message, and sends an RRC connection reconfiguration message to the UE.

The Radio Resource Control (English: Radio Resource Control, RRC) connection reconfiguration message is used to instruct the UE to establish the signaling radio bearer between the UE and the DU, and the RRC connection reconfiguration message includes: the integrity protection algorithm determined by the DU, the first random number, and the identifier of the signaling radio bearer.

Step 109: The UE receives the RRC connection reconfiguration message, establishes the signaling radio bearer between the UE and the DU, generates the first key based on the root key generated in step 103, a cell identifier of a primary serving cell, of the UE, operated by the DU, and a carrier frequency of the primary serving cell, then generates the second key based on the first random number in the RRC connection reconfiguration message and the first key, and further generates, based on the second key, the third key used to perform integrity protection on the control signaling between the DU and the UE.

So far, the UE has already successfully activated an integrity protection function for the signaling radio bearer between the DU and the UE.

Step 110: The UE returns an RRC connection reconfiguration success message to the CU.

The RRC connection reconfiguration success message is used to indicate that the signaling radio bearer has already been established between the UE and the DU.

Step 111: The DU generates a MAC-I based on the identifier of the signaling radio bearer determined in step 106, the third key, and the integrity protection algorithm.

In some embodiments, for a process in which the DU may generate the MAC-I based on the identifier of the signaling radio bearer, the third key, and the integrity protection algorithm, refer to the prior art. Details are not described herein again.

Step 112: The DU sends, to the UE, the control signaling carrying the MAC-I.

Step 113: The UE performs integrity check on the received control signaling.

The performing, by the UE, integrity check on the received control signaling may include:

generating, by the UE, a MAC-I based on the identifier of the signaling radio bearer obtained in step 109, the integrity protection algorithm, and the third key generated in step 109, and comparing the MAC-I with the MAC-I carried in the control signaling, where if the two are the same, it indicates that integrity check succeeds, or if the two are different, it indicates that integrity check fails.

It should be noted that, in the method process shown in FIG. 6, steps 106 and 107 are performed by the RRC layer in the DU shown in FIG. 3, and steps 111 and 112 are performed by the PDCP layer in the DU shown in FIG. 3. Therefore, integrity protection may be provided, based on the control plane protocol stack architecture between the DU and the UE shown in FIG. 3, to the control signaling exchanged between the DU and the UE. Moreover, parameters required for calculating a MAC-I include but are not limited to: an identifier of a signaling radio bearer, a key, and an integrity protection algorithm, and may further include a control signaling transmission direction (direction). This is not limited herein.

Further, in some cases in actual application, a key for performing integrity protection between the UE and the DU needs to be updated, and based on different update triggering reasons, the following two cases may exist:

First case: Because a root key between the CU and the UE is updated, a key between the DU and the UE needs to be updated.

Second case: Only a key between the DU and the UE needs to be updated.

Key update processes in the foregoing two cases are separately described in detail below:

(1) The root key between the CU and the UE is updated.

Step 1: After the root key between the UE and the CU is updated, the CU and the UE synchronously obtain a new root key separately by performing steps S101 and S103.

Step 2: The CU derives a new first key based on the new root key, a cell identifier of a primary serving cell, of the UE, operated by the DU, and a carrier frequency of the primary serving cell.

Step 3: The CU sends a key update request message to the DU, where the key update request message includes the new first key.

Step 4: The DU receives the key update request message, generates a second random number, and generates a new second key based on the second random number and the new first key.

The second random number may be the same as or different from the foregoing first random number. This is not limited herein.

Step 5: The DU sends a key modification request message to the UE, where the key modification request message includes the second random number.

Step 6: The UE receives the key modification request message; and first generates the new first key based on the new root key generated in step 1, the cell identifier of the primary serving cell, of the UE, operated by the DU, and the carrier frequency of the primary serving cell, then generates the new second key based on the new first key and the second random number, and further derives, based on the second key, a new third key used to perform integrity protection on control signaling between the DU and the UE.

Step 7: The UE returns a key modification response message to the DU, where the key modification response message is used to notify the DU that the UE has already successfully modified a key used to perform integrity protection the control signaling between the DU and the UE.

(2) Only the key between the DU and the UE needs to be updated.

Step 1: When the key between the UE and the DU needs to be updated, the DU generates a third random number, and generates a new second key based on the first key in the signaling radio bearer establishment request message received in step S106 and the third random number.

The third random number may be the same as or different from the first random number. This is not limited herein.

Step 2: The DU sends a key modification request message to the UE, where the key modification request message includes the third random number.

Step 3: The UE receives the key modification request message, generates a new second key based on the first key generated in step 109 and the third random number, and further derives, based on the second key, a new third key used to perform integrity protection on control signaling between the DU and the UE.

Step 4: The UE returns a key modification response message to the DU, where the key modification response message is used to notify the DU that the UE has already successfully modified a key used to perform integrity protection the control signaling between the DU and the UE.

It can be learned from the process shown in FIG. 6 that, in the solution, the integrity protection algorithm and the random number that are determined on the DU side are first notified to the CU, and then are notified by the CU to the UE rather than being directly notified by the DU to the UE.

Figure 7:
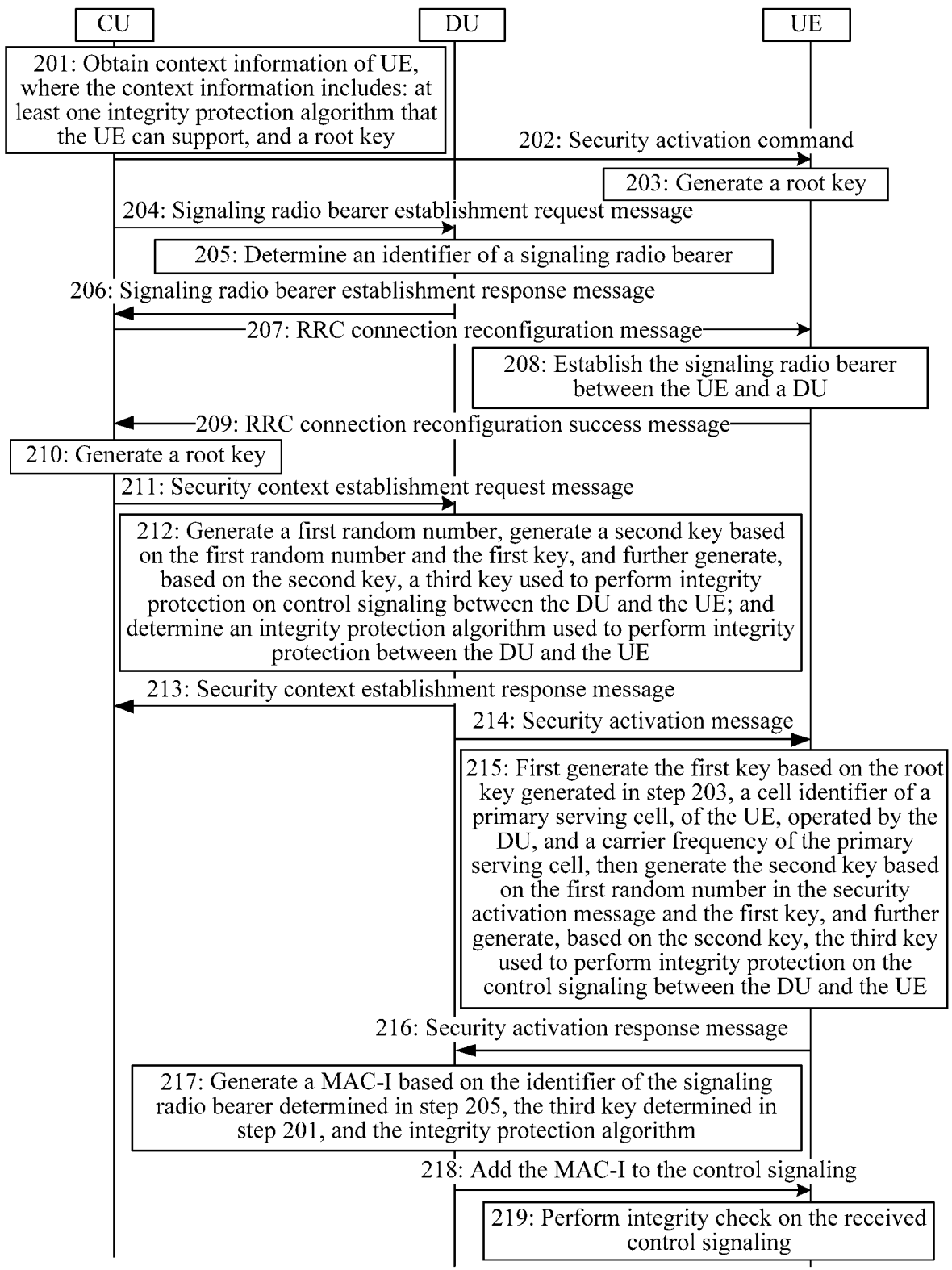
FIG. 7 is a flowchart of a control signaling processing method according to an embodiment of the present invention.

Further, In some embodiments, to reduce notification complexity and prevent the integrity protection algorithm selected by the DU from being notified to the CU, alternatively, in another implementation solution according to the embodiments of the present invention, when the CU is unaware of the integrity protection algorithm and the random number that are determined on the DU side, the DU may further directly notify the integrity protection algorithm and the random number that are determined by the DU to the UE, and a specific implementation is shown in FIG. 7.

FIG. 7 is a flowchart of another control signaling processing method according to an embodiment of the present invention. The method may also be applied to the control plane protocol stack architecture between the DU and the UE shown in FIG. 3, and is performed through interaction between the CU, the DU, and the UE shown in FIG. 2. In the control plane protocol stack architecture, a control function of the DU is implemented by using an RRC layer in the DU, a signaling radio bearer is established between the UE and the DU to transmit control signaling between the UE and the DU, and integrity protection on the signaling radio bearer is implemented by a PDCP layer in the DU. As shown in FIG. 7, the method may include the following steps.

Step 201: The CU obtains context information of the UE, where the context information includes: at least one integrity protection algorithm that the UE can support, and a root key.

A process in which the CU obtains the context information of the UE in step 201 is the same as that in step S101. Details are not described herein again.

Step 202: The CU sends a security activation command to the UE, where the security activation command is used to activate an integrity protection function for a signaling radio bearer between the UE and the CU.

Step 203: The UE receives the security activation command sent by the CU, and generates a root key.

Step 204: The CU sends a signaling radio bearer establishment request message to the DU.

The signaling radio bearer establishment request message is used to instruct the DU to establish a signaling radio bearer between the DU and the UE.

Step 205: The DU receives the signaling radio bearer establishment request message, and determines an identifier of the signaling radio bearer.

Step 206: The DU returns a signaling radio bearer establishment response message to the CU, where the signaling radio bearer establishment response message includes the identifier of the signaling radio bearer.

Step 207: The CU receives the signaling radio bearer establishment response message, and sends an RRC connection reconfiguration message to the UE, where the RRC link reconstruction message includes the identifier of the signaling radio bearer.

Step 208: The UE receives the RRC connection reconfiguration message, and establishes the signaling radio bearer between the UE and the DU.

Step 209: The UE returns an RRC connection reconfiguration success message to the CU.

Step 210: The CU generates a first key based on the root key.

It should be noted that, steps shown in FIG. 7 are only an example of steps, and an order of performing the steps is not limited thereto. In some embodiments, step 210 may be further performed between step 201 and step 202.

A specific implementation process of step 201 is the same as that of step 104. Details are not described herein again.

Step 211: The CU sends a security context establishment request message to the DU, where the security context establishment request message includes the first key, and the at least one integrity protection algorithm that the UE can support and that is obtained in step 201.

Step 212: The DU receives the security context establishment request message, generates a first random number, generates a second key based on the first random number and the first key, further generates, based on the second key, a third key used to perform integrity protection on control signaling between the DU and the UE, and determines an integrity protection algorithm used to perform integrity protection between the DU and the UE.

So far, the DU has already successfully activated an integrity protection function for the signaling radio bearer between the DU and the UE.

Step 213: The DU returns a security context establishment response message to the CU, where the security context response message is used to notify the CU that the DU has already successfully obtained a security context message of the UE.

Step 214: The DU sends a security activation message to the UE, where the security activation message includes the integrity protection algorithm determined by the DU and the first random number.

Step 215: The UE receives the security activation message sent by the CU; and first generates the first key based on the root key generated in step 203, a cell identifier of a primary serving cell, of the UE, operated by the DU, and a carrier frequency of the primary serving cell, then generates the second key based on the first random number in the security activation message and the first key, and further generates, based on the second key, the third key used to perform integrity protection on the control signaling between the DU and the UE.

So far, the UE has already successfully activated an integrity protection function for the signaling radio bearer between the DU and the UE.

Step 216: The UE returns a security activation response message to the DU, where the security activation response message is used to notify the DU that the UE has already successfully activated the integrity protection function between the DU and the UE.

Step 217: The DU generates a MAC-I based on the identifier of the signaling radio bearer determined in step 205, the third key determined in step 201, and the integrity protection algorithm.

In some embodiments, step 217 is the same as step 111. Details are not described herein again.

Step 218: The DU sends, to the UE, the control signaling carrying the MAC-I.

Step 219: The UE performs integrity check on the received control signaling.

Step 219 is the same as step 113. Details are not described herein again.

It should be noted that, in the method process shown in FIG. 7, steps 205, 207, 212 to 214 are performed by the RRC layer in the DU shown in FIG. 3, and steps 217 to 1218 are performed by the PDCP layer in the DU shown in FIG. 3. Moreover, parameters required for calculating a MAC-I include but are not limited to: an identifier of a signaling radio bearer, a key, and an integrity protection algorithm, and may further include a control signaling transmission direction (direction). This is not limited herein.

Further, In some embodiments, in a process of performing FIG. 7, key update also occurs in the foregoing first case or second case. For a process performed during key update, refer to the foregoing process. Details are not described herein again.

It can be learned from the foregoing that, solutions shown in FIG. 6 and FIG. 7 are both performed based on the RRC layer and the PDCP layer of the DU in the control plane protocol stack architecture between the DU and the UE shown in FIG. 3, and the DU and the UE need to have peer RRC layers and PDCP layers.

Further, In some embodiments, to avoid complexity caused because the UE needs to maintain both an RRC connection between the UE and the CU and an RRC connection between the UE and the DU, alternatively, in still another implementation solution according to the embodiments of the present invention, the control function of the DU may be further implemented by any layer in the Layer 2 of the DU, and integrity protection is performed on the control signaling. Specifically, the implementation process is shown in FIG. 8.

Figure 8:
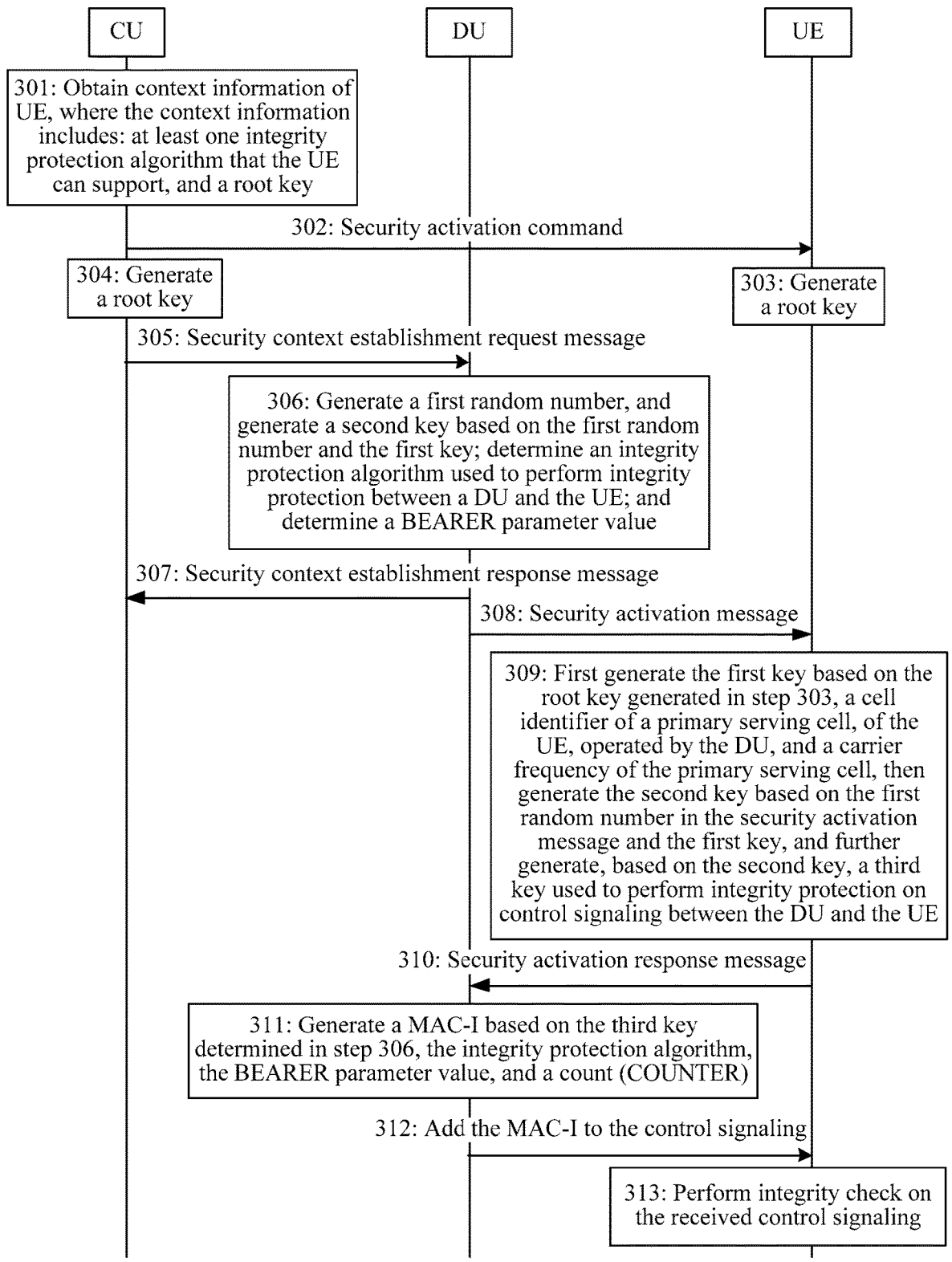
FIG. 8 is a flowchart of a control signaling processing method according to an embodiment of the present invention.

FIG. 8 is a flowchart of still another control signaling processing method according to an embodiment of the present invention. The method may be applied to the control plane protocol stack architecture between the DU and the UE shown in FIG. 5, and is performed through interaction between the CU, the DU, and the UE shown in FIG. 2. In the control plane protocol stack architecture, a control function of the DU is implemented by using a layer (an RLC layer or a MAC layer) in a Layer 2, and a signaling radio bearer does not need to be established between the UE and the DU to transmit control signaling between the UE and the DU. Instead, control signaling is transmitted by using a Layer 2 message, and integrity protection is performed on the Layer 2 message carrying the control signaling. As shown in FIG. 8, the method may include the following steps.

Step 301: The CU obtains context information of the UE, where the context information includes: at least one integrity protection algorithm that the UE can support, and a root key.

Step 301 is the same as step 101. Details are not described herein again.

Step 302: The CU sends a security activation command to the UE, where the security activation command is used to activate an integrity protection function for a signaling radio bearer between the UE and the CU.

Step 303: The UE receives the security activation command sent by the CU, and generates a root key.

Step 303 is the same as step 103. Details are not described herein again.

Step 304: The CU generates a first key based on the root key obtained by the CU.

Step 304 is the same as step 104. Details are not described herein again.

Step 305: The CU sends a security context establishment request message to the DU, where the security context establishment request message includes the first key, and the at least one integrity protection algorithm that the UE can support and that is obtained in step 201.

Step 306: The DU receives the security context establishment request message, and performs the following three actions:

(1) generating a first random number, and generating a second key based on the first random number and the first key;

(2) determining an integrity protection algorithm used to perform integrity protection between the DU and the UE; and (3) determining a BEARER parameter value.

So far, the DU has already successfully activated an integrity protection function for the signaling radio bearer between the DU and the UE.

The BEARER parameter value may be a logical channel identifier allocated by the DU to a control channel between the DU and the UE, and the logical channel identifier is used to indicate that a Media Access Control service data unit (English: Medium Access Control Service Data Unit, MAC SDU) corresponding to the logical channel identifier is L2 control signaling; or the BEARER parameter value may be fixed to be a special value. For example, if a quantity of bits of a BEARER parameter is five, a value of the BEARER parameter may be 11111.

Step 307: The DU returns a security context establishment response message to the CU, where the security context response message is used to notify the CU that the DU has already successfully obtained a security context message of the UE.

Step 308: The DU sends a security activation message to the UE, where the security activation message includes the integrity protection algorithm determined by the DU, the first random number, and the BEARER parameter value.

Step 309: The UE receives the security activation message sent by the CU; and first generates the first key based on the root key generated in step 303, a cell identifier of a primary serving cell, of the UE, operated by the DU, and a carrier frequency of the primary serving cell, then generates the second key based on the first random number in the security activation message and the first key, and further generates, based on the second key, a third key used to perform integrity protection on the control signaling between the DU and the UE.

So far, the UE has already successfully activated an integrity protection function for the signaling radio bearer between the DU and the UE.

Step 310: The UE returns a security activation response message to the DU, where the security activation response message is used to notify the DU that the UE has already successfully activated the integrity protection function between the DU and the UE.

Step 311: The DU generates a MAC-I based on the third key determined in step 306, the integrity protection algorithm, the BEARER parameter value, and a count (COUNTER).

A sequence number (English: Sequence Number, SN) may be associated with each piece of L2 layer control signaling between the UE and the DU, the SN and the control signaling are sent to the UE together, the SN is used as the count; or a local variable (VarCount) is maintained on the DU side, and VarCount is used as the count, where each time after the DU sends a piece of L2 layer control signaling between the UE and the DU to the UE, and receives an acknowledgement (English: Acknowledgement, ACK) message that is fed back by the UE and that indicates that the L2 layer control signaling is successfully received, a value of the local variable is updated to VarCount+1.

Step 312: The DU sends, to the UE, the control signaling carrying the MAC-I.

The control signaling is carried in a Layer 2 message.

Step 313: The UE performs integrity check on the received control signaling.

The performing, by the UE, integrity check on the received control signaling may include:

generating, by the UE, a MAC-I based on the logical channel identifier obtained in step 309, the third key, the BEARER parameter value, and the count that is maintained by the UE, and comparing the MAC-I with the MAC-I carried in the control signaling, where if the two are the same, it indicates that integrity check succeeds, or if the two are different, it indicates that integrity check fails.

An SN in the control signaling that includes the SN and that is received by the UE may be used as the count in the check process in step 313; or a local variable (VarCount) is maintained on the UE side, and VarCount is used as the count, where after the UE receives a piece of L2 layer control signaling between the UE and the DU sent by the DU, and feeds back an acknowledgement (English: Acknowledgement, ACK) message to the DU, a value of the local variable is updated to VarCount+1.

Figure 5:
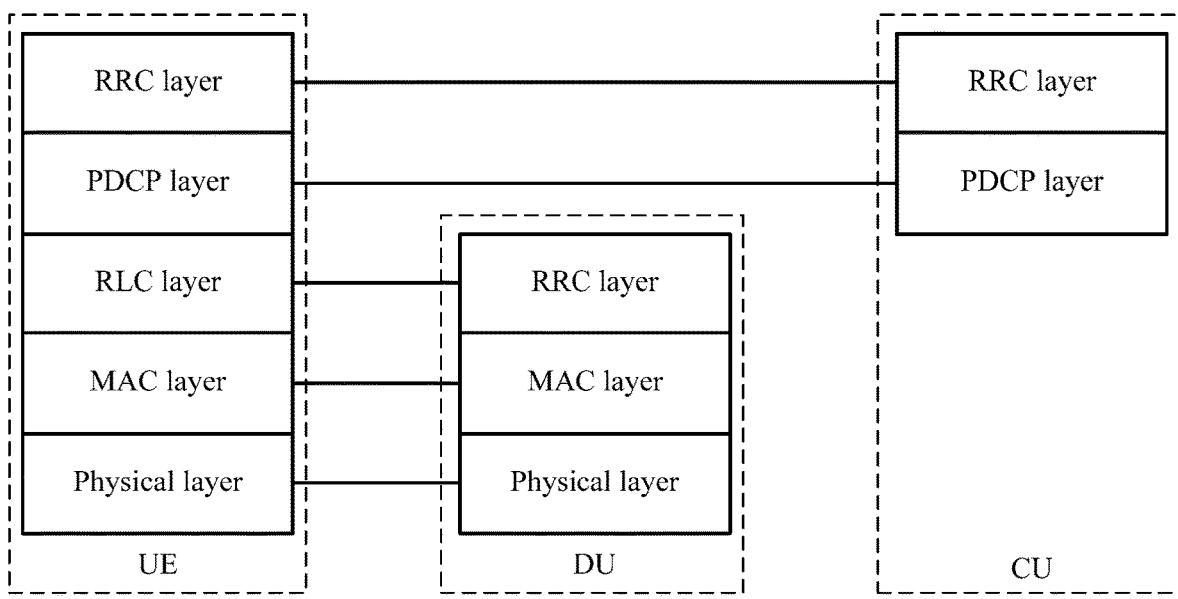
FIG. 5 is a schematic diagram of still another control plane protocol architecture according to an embodiment of the present invention.

It should be noted that, in the method process shown in FIG. 8, a step performed by the DU is performed by the RLC layer or the MAC layer in the DU shown in FIG. 5. Moreover, parameters required for calculating a MAC-I include but are not limited to: a BEARER parameter value, a key, a count, and an integrity protection algorithm, and may further include a control signaling transmission direction (direction). This is not limited herein.

Further, In some embodiments, in a process of performing FIG. 8, key update also occurs in the foregoing first case or second case. For a process performed during key update, refer to the foregoing process. Details are not described herein again.

An integrity protection solution provided in the embodiments of the present invention is described above mainly from the perspective of interaction between the first network device, the second network device, and the UE by using the first network device as a CU and the second network device as a DU. It can be understood that, to implement the foregoing functions, the first network device, the second network device, and the UE include corresponding hardware structures and/or software modules for performing the functions. Persons of ordinary skill in the art should be easily aware that, the units and algorithm steps in the examples described with reference to the embodiments disclosed in this specification may be implemented by hardware or a combination of hardware and computer software. Whether the functions are performed by hardware or computer software driving hardware depends on particular applications and design constraint conditions of the technical solutions. Persons skilled in the art may use different methods to implement the described functions for each particular application, but it should not be considered that the implementation goes beyond the scope of the present invention.

In the embodiments of the present invention, functional modules of the first network device, the second network device and the UE may be divided based on the foregoing method examples and with reference to FIG. 6 to FIG. 8. For example, the functional modules may be divided corresponding to the functions, or two or more functions may be integrated in one processing module. The integrated module may be implemented in a form of hardware, or may be implemented in a form of a functional module of software. It should be noted that the module division in the embodiments of the present invention is an example, and is merely logical function division. There may be another division manner in an actual implementation.

Figure 9:
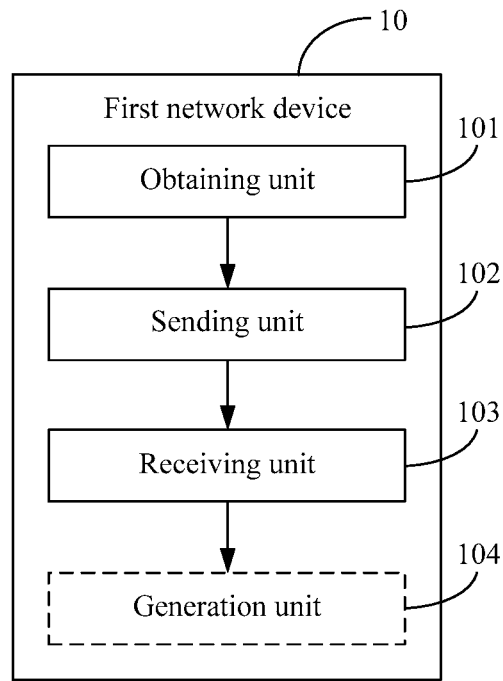
FIG. 9 is a schematic structural diagram of a first network device 10 according to an embodiment of the present invention.

When functional modules are divided corresponding to functions, FIG. 9 is a possible schematic structural diagram of a first network device according to an embodiment of the present invention. As shown in FIG. 9, the first network device 10 may be configured to implement the method performed by the CU in the method embodiments shown in FIG. 6 and FIG. 7. The first network device 10 may include: an obtaining unit 101, a sending unit 102, a receiving unit 103, and a generation unit 104. For example, the obtaining unit 101 is configured to support the first network device in performing the process 101 in FIG. 6 and the process 201 in FIG. 7, the sending unit 102 is configured to support the first network device in performing the processes 102, 105, and 108 in FIG. 6 and the processes 202, 204, 207, and 211 in FIG. 7, the receiving unit 103 is configured to support the first network device in performing the processes 107 and 110 in FIG. 6 and the processes 206, 209, and 213 in FIG. 7, and the generation unit 104 is configured to support the first network device in performing the process 102 in FIG. 6 and the process 210 in FIG. 7.

All related content of the steps in the foregoing method embodiments may be quoted to function descriptions of the corresponding functional modules. Details are not described herein again.

Figure 10:
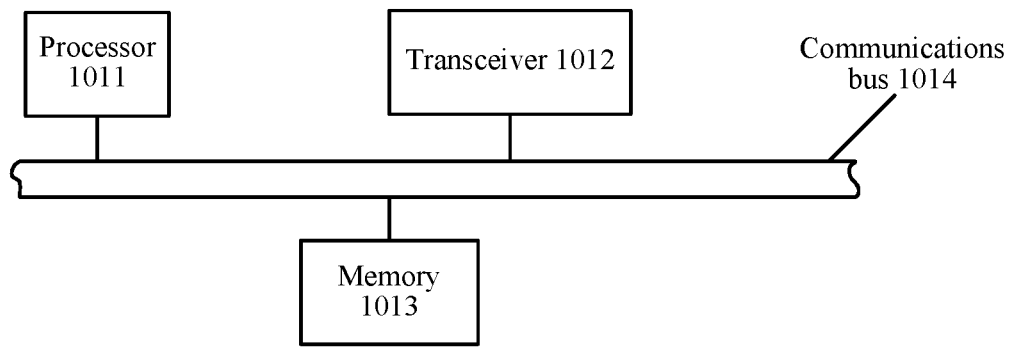
FIG. 10 is a schematic structural diagram of a first network device 10 according to an embodiment of the present invention.

When units are integrated, FIG. 10 is a possible schematic structural diagram of a first network device according to an embodiment of the present invention. As shown in FIG. 10, the first network device 10 may include: a processor 1011, a transceiver 1012, a memory 1013, and a communications bus 1014.

The processor 1011 may be a central processing unit (English: central processing unit, CPU), a network processor (English: network processor, NP), a hardware chip, or any combination thereof. The hardware chip may be an application-specific integrated circuit (English: application-specific integrated circuit, ASIC), a programmable logic device (English: programmable logic device, PLD), or a combination thereof. The PLD may be a complex programmable logic device (English: complex programmable logic device, CPLD), a field-programmable logic gate array (English: field-programmable gate array, FPGA), a generic array logic (English: generic array logic, GAL), or any combination thereof.

The transceiver 1012 may be configured to exchange data with an external network element. The transceiver 1012 may be antenna.

The memory 1013 may be a volatile memory (English: Volatile Memory) such as a random-access memory (English: Random-Access Memory, RAM); a non-volatile memory (English: Non-volatile Memory) such as a read-only memory (English: Read-only Memory, ROM), a flash memory (English: Flash Memory), a hard disk drive (English: Hard Disk Drive, HDD), or a solid-state drive (English: Solid-state Drive, SSD); or a combination of the foregoing types of memories. By running or executing program code stored in the memory 1013 and invoking data stored in the memory 1013, the processor 1011 may implement various functions of the first network device.

The communications bus 1014 may be classified into an address bus, a data bus, a control bus, and the like, and may be an industry standard architecture (English: Industry Standard Architecture, ISA) bus, a Peripheral Component interconnect (English: Peripheral Component, PCI) bus, an extended industry standard architecture (English: Extended Industry Standard Architecture, EISA) bus, or the like. For ease of indication, the bus is indicated by using only one bold line in FIG. 10. However, it does not indicate that there is only one bus or only one type of bus.

It should be noted that, the obtaining unit 101 and the generation unit 104 shown in FIG. 9 may be integrated in the processor 1011 shown in FIG. 10, to enable the processor 1011 to perform specific functions of the obtaining unit 101 and the generation unit 104, and the sending unit 102 and the receiving unit 103 may be integrated in the transceiver 1012 shown in FIG. 10, to enable the transceiver 1012 to perform specific functions of the sending unit 102 and the receiving unit 103.

Figure 11:
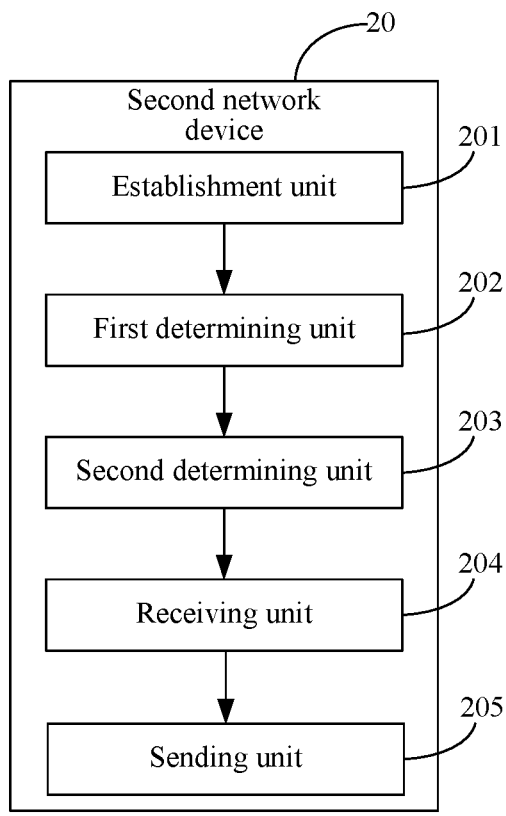
FIG. 11 is a schematic structural diagram of a second network device 20 according to an embodiment of the present invention.

When functional modules are divided corresponding to functions, FIG. 11 is a possible schematic structural diagram of a second network device according to an embodiment of the present invention. As shown in FIG. 11, the second network device 20 may be configured to implement the methods performed in the method embodiments shown in FIG. 6 and FIG. 7, the second network device has the control protocol stack shown in FIG. 3, and the second network device 20 may include: an establishment unit 201, a first determining unit 202, a second determining unit 203, a receiving unit 204, and a sending unit 205. The first determining unit 202 is located in a first protocol layer entity of the second network device 20, and the second determining unit 203 is located in a second protocol layer entity of the second network device 20. For example, the first determining unit 202 is configured to support the second network device in performing the process 106 in FIG. 6 and the processes 205 and 212 in FIG. 7, the receiving unit 204 is configured to support the second network device in performing the process 105 in FIG. 6 and the processes 204, 211, and 216 in FIG. 7, the sending unit 205 is configured to support the second network device in performing the processes 107 and 112 in FIG. 6 and the processes 206, 213, 214, and 218 in FIG. 7, and the second determining unit 203 is configured to support the second network device in performing the process 111 in FIG. 6 and the process 217 in FIG. 7.

All related content of the steps in the foregoing method embodiments may be quoted to function descriptions of the corresponding functional modules. Details are not described herein again.

Figure 12:
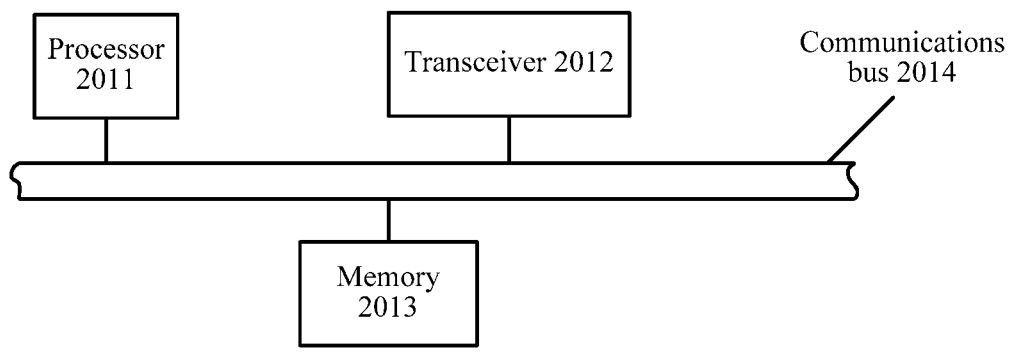
FIG. 12 is a schematic structural diagram of a second network device 20 according to an embodiment of the present invention.

When units are integrated, FIG. 12 is a possible schematic structural diagram of a first network device according to an embodiment of the present invention. As shown in FIG. 12, the first network device 20 may include: a processor 2011, a transceiver 2012, a memory 2013, and a communications bus 2014.

The processor 2011 may be a CPU, an NP, a hardware chip, or any combination thereof. The hardware chip may be an ASIC, a PLD, or a combination thereof. The PLD may be a CPLD, an FPGA, a GAL, or any combination thereof.

The transceiver 2012 may be configured to exchange data with an external network element. The transceiver 2012 may be antenna.

The memory 2013 may be a volatile memory such as a RAM; a non-volatile memory such as a ROM, a flash memory (English: Flash Memory), an HDD, or an SSD; or a combination of the foregoing types of memories. By running or executing program code stored in the memory 2013 and invoking data stored in the memory 2013, the processor 2011 may implement various functions of the second network device.

The communications bus 2014 may be classified into an address bus, a data bus, a control bus, and the like, and may be an ISA bus, a PCI bus, an EISA bus, or the like. For ease of indication, the bus is indicated by using only one bold line in FIG. 12. However, it does not indicate that there is only one bus or only one type of bus.

It should be noted that, the establishment unit 201, the first determining unit 202, and the second determining unit 203 shown in FIG. 11 may be integrated in the processor 2011 shown in FIG. 12, to enable the processor 2011 to perform specific functions of the establishment unit 201, the first determining unit 202, and the second determining unit 203, and the receiving unit 204 and the sending unit 205 may be integrated in the transceiver 2012 shown in FIG. 12, to enable the transceiver 2012 to perform specific functions of the receiving unit 204 and the sending unit 205.

Figure 13:
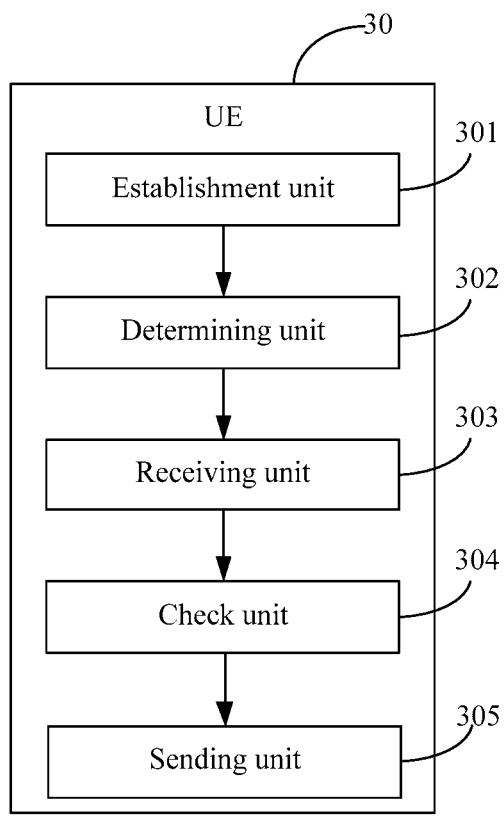
FIG. 13 is a schematic structural diagram of UE 30 according to an embodiment of the present invention.

When functional modules are divided corresponding to functions, FIG. 13 is a possible schematic structural diagram of UE according to an embodiment of the present invention. As shown in FIG. 13, the UE 30 may be configured to implement the methods performed in the method embodiments shown in FIG. 6 and FIG. 7, and the UE 30 may include: an establishment unit 301, a determining unit 302, a receiving unit 303, a check unit 304, and a sending unit 305. For example, the establishment unit 301 is configured to support the UE 30 in performing the process 208 in FIG. 7, the determining unit 302 is configured to support the UE in performing the processes 103 and 109 in FIG. 6 and the processes 203 and 215 in FIG. 7, the receiving unit 303 is configured to support the UE in performing the processes 102, 108, and 112 in FIG. 6 and the processes 207, 214, and 218 in FIG. 7, the check unit 304 is configured to support the UE in performing the process 113 in FIG. 6 and the process 219 in FIG. 7, and the sending unit 305 is configured to support the UE in performing the process 110 in FIG. 6 and the processes 209 and 216 in FIG. 7.

All related content of the steps in the foregoing method embodiments may be quoted to function descriptions of the corresponding functional modules. Details are not described herein again.

Figure 14:
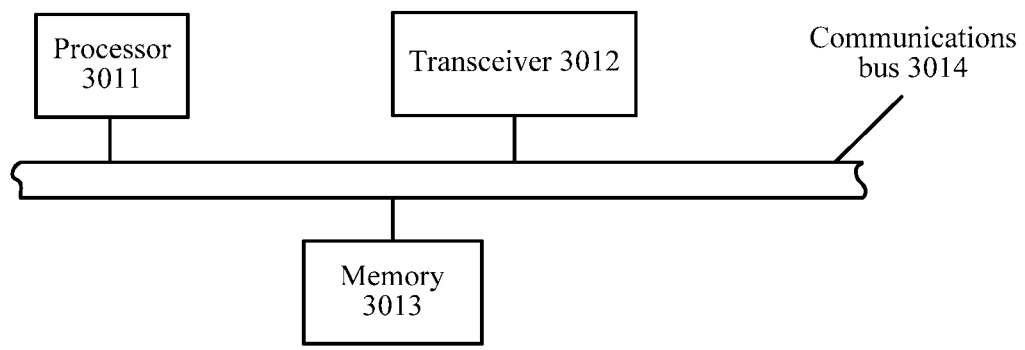
FIG. 14 is a schematic structural diagram of UE 30 according to an embodiment of the present invention.

When units are integrated, FIG. 14 is a possible schematic structural diagram of UE according to an embodiment of the present invention. As shown in FIG. 13, the UE 30 may include: a processor 3011, a transceiver 3012, a memory 3013, and a communications bus 3014.

The processor 3011 may be a CPU, an NP, a hardware chip, or any combination thereof. The hardware chip may be an ASIC, a PLD, or a combination thereof. The foregoing PLD may be a CPLD, an FPGA, a GAL, or any combination thereof.

The transceiver 3012 may be configured to exchange data with an external network element. The transceiver 3012 may be antenna.

The memory 3013 may be a volatile memory such as a RAM; a non-volatile memory such as a ROM, a flash memory (English: Flash Memory), an HDD, or an SSD; or a combination of the foregoing types of memories. By running or executing program code stored in the memory 3013 and invoking data stored in the memory 3013, the processor 3011 may implement various functions of the UE.

The communications bus 3014 may be classified into an address bus, a data bus, a control bus, and the like, and may be an ISA bus, a PCI bus, an EISA bus, or the like. For ease of indication, the bus is indicated by using only one bold line in FIG. 14. However, it does not indicate that there is only one bus or only one type of bus.

It should be noted that, the establishment unit 301, the determining unit 302, and the check unit 304 shown in FIG. 13 may be integrated in the processor 3011 shown in FIG. 14, to enable the processor 3011 to perform specific functions of the establishment unit 301, the determining unit 302, and the check unit 304, and the receiving unit 303 and the sending unit 305 may be integrated in the transceiver 3012 shown in FIG. 14, to enable the transceiver 3012 to perform specific functions of the receiving unit 303 and the sending unit 305.

Figure 15:
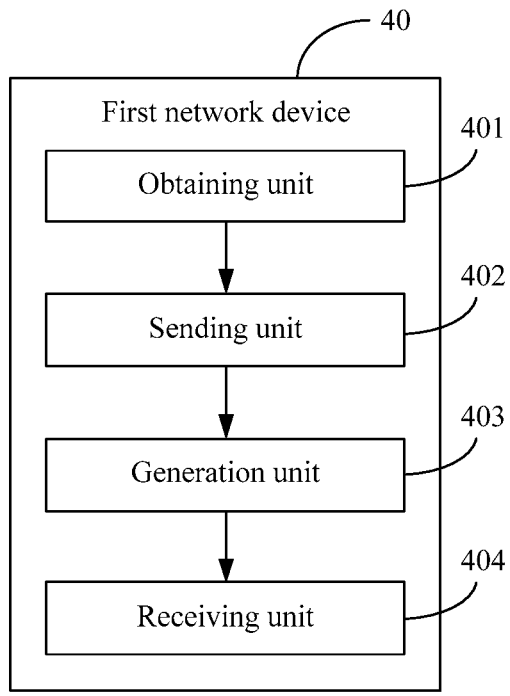
FIG. 15 is a schematic structural diagram of a first network device 40 according to an embodiment of the present invention.

When functional modules are divided corresponding to functions, FIG. 15 is a possible schematic structural diagram of a first network device according to an embodiment of the present invention. As shown in FIG. 15, the first network device 40 may be configured to implement the method performed by the CU in the method embodiment shown in FIG. 8. The first network device 40 may include: an obtaining unit 401, a sending unit 402, a generation unit 403, and a receiving unit 404. For example, the obtaining unit 401 is configured to support the first network device in performing the process 301 in FIG. 8, the sending unit 402 is configured to support the first network device in performing the processes 302 and 305 in FIG. 8, the receiving unit 404 is configured to support the first network device in performing the process 307 in FIG. 8, and the generation unit 403 is configured to support the first network device in performing the process 304 in FIG. 8.

All related content of the steps in the foregoing method embodiments may be quoted to function descriptions of the corresponding functional modules. Details are not described herein again.

When units are integrated, the obtaining unit 401 and the generation unit 403 shown in FIG. 15 may be integrated in the processor 1011 shown in FIG. 10, to enable the processor 1011 to perform specific functions of the obtaining unit 401 and the generation unit 403, and the sending unit 402 and the receiving unit 404 may be integrated in the transceiver 1012 shown in FIG. 10, to enable the transceiver 1012 to perform specific functions of the sending unit 402 and the receiving unit 404.

Figure 16:
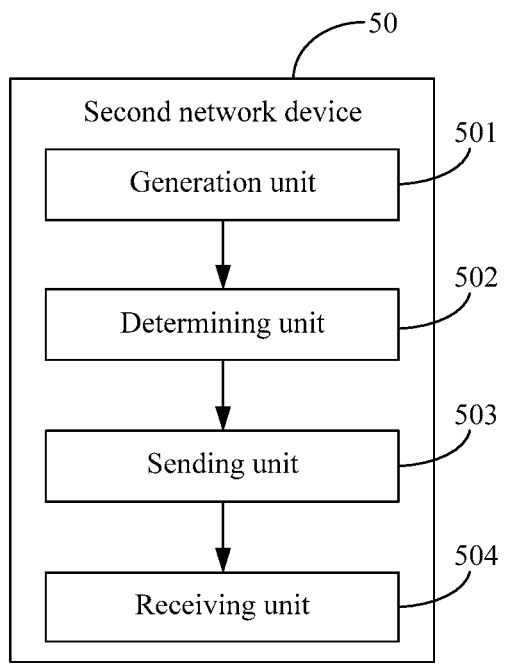
FIG. 16 is a schematic structural diagram of a second network device 50 according to an embodiment of the present invention.

When functional modules are divided corresponding to functions, FIG. 16 is a possible schematic structural diagram of a second network device according to an embodiment of the present invention. As shown in FIG. 16, the second network device 50 may be configured to implement the method performed in the method embodiment shown in FIG. 8, the second network device has the control protocol stack shown in FIG. 5, and the second network device 50 may include: a generation unit 501, a determining unit 502, a sending unit 503, and a receiving unit 504. For example, the generation unit 501 is configured to support the second network device in performing the processes 306 and 311 in FIG. 8, the determining unit 502 is configured to support the second network device in performing the process 306 in FIG. 8, the sending unit 503 is configured to support the second network device in performing the processes 307, 308, and 312 in FIG. 8, and the receiving unit 504 is configured to support the second network device in performing the processes 305 and 310 in FIG. 8.

All related content of the steps in the foregoing method embodiments may be quoted to function descriptions of the corresponding functional modules. Details are not described herein again.

When units are integrated, the generation unit 501 and the determining unit 502 shown in FIG. 16 may be integrated in the processor 2011 shown in FIG. 12, to enable the processor 2011 to perform specific functions of the generation unit 501 and the determining unit 502, and the sending unit 503 and the receiving unit 504 may be integrated in the transceiver 2012 shown in FIG. 12, to enable the transceiver 2012 to perform specific functions of the sending unit 503 and the receiving unit 504.

Figure 17:
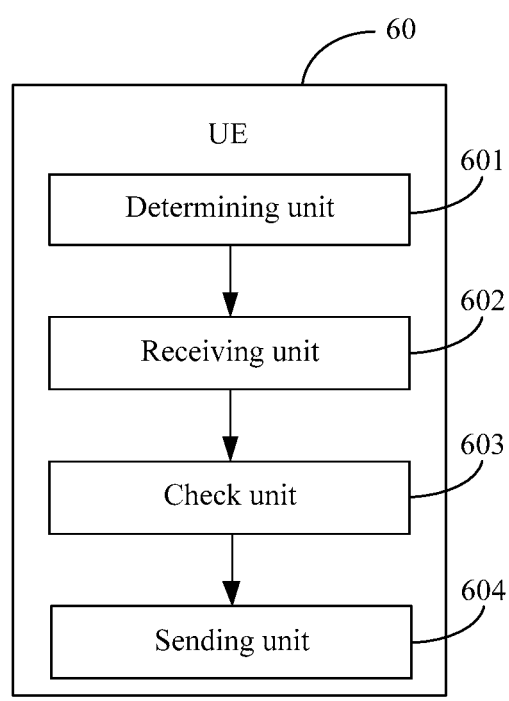
FIG. 17 is a schematic structural diagram of UE 60 according to an embodiment of the present invention.

When functional modules are divided corresponding to functions, FIG. 17 is a possible schematic structural diagram of UE according to an embodiment of the present invention. As shown in FIG. 17, the UE 60 may be configured to implement the method performed in the method embodiment shown in FIG. 8, and the UE 60 may include: a determining unit 601, a receiving unit 602, a check unit 603, and a sending unit 604. For example, the determining unit 601 is configured to support the UE 60 in performing the processes 303 and 309 in FIG. 8, the receiving unit 602 is configured to support the UE 60 in performing the processes 302, 308, and 312 in FIG. 8, the check unit 603 is configured to support the UE 60 in performing the process 313 in FIG. 8, and the sending unit 604 is configured to support the UE 60 in performing the process 310 in FIG. 8.

All related content of the steps in the foregoing method embodiments may be quoted to function descriptions of the corresponding functional modules. Details are not described herein again.

When units are integrated, the determining unit 601 and the check unit 603 shown in FIG. 17 may be integrated in the processor 3011 shown in FIG. 14, to enable the processor 3011 to perform specific functions of the determining unit 601 and the check unit 603, and the receiving unit 602 and the sending unit 604 may be integrated in the transceiver 3012 shown in FIG. 14, to enable the transceiver 3012 to perform specific functions of the receiving unit 602 and the sending unit 604.

According to still another aspect, an embodiment of the present invention further provides a control signaling processing system. The control signaling processing system may include: the first network device 10, the second network device 20, and the UE 30 according to any one of the foregoing embodiments; or the first network device 40, the second network device 50, and the UE 60 according to any one of the foregoing embodiments.

The control signaling processing system provided in this embodiment of the present invention implements the control signaling processing method shown in FIG. 6 to FIG. 8, and therefore can achieve a beneficial effect the same as that achieved in the foregoing service transmission method. Details are not repeated herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts displayed as units may or may not be physical units, may be located in one position, or may be distributed on a plurality of network devices. Some or all of the units may be selected according to actual needs to achieve the objectives of the solutions of the embodiments.

Additionally, functional units in each embodiment of the present invention may be integrated in one processing unit, functional units may independently exist, or two or more units may be integrated in one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present invention. The foregoing storage medium includes: any medium that can store program code, such as a Universal Serial Bus (English: Universal Serial Bus, USB) flash drive (English: USB flash drive), a removable hard disk, a read-only memory (English: Read-Only Memory, ROM), a random access memory (English: random access memory, RAM), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the claims.

What is claimed is:

1. A control signaling processing method, wherein the method is applied to an access network architecture comprising a first network device and a second network device, wherein the first network device is connected to the second network device, the second network device is connected to at least one user equipment (UE), the method is performed by the second network device, the second network device comprises a first protocol layer entity and a second protocol layer entity, and the method comprises:

establishing, by the second network device, a signaling radio bearer between the second network device and UE, wherein the signaling radio bearer is for transmitting control signaling between the second network device and the UE, and the UE is any one of the at least one UE;

determining, by the first protocol layer entity of the second network device, integrity protection parameters and an integrity protection algorithm for performing integrity protection on the control signaling between the second network device and the UE;

determining, by the second protocol layer entity of the second network device, a message authentication code MAC-I based on the integrity protection parameters and the integrity protection algorithm;

generating, by the first protocol layer entity of the second network device, the control signaling, and sending the control signaling to the second protocol layer entity of the second network device;

receiving, by the second protocol layer entity of the second network device, the control signaling sent by the first protocol layer entity of the second network device; and sending, by the second protocol layer entity of the second network device, to the UE, the control signaling carrying the MAC-I.

2. The method according to claim 1, wherein the integrity protection parameters comprise: an identifier of the signaling radio bearer and a third key for performing integrity protection on the signaling radio bearer between the second network device and the UE; before establishing, by the second network device, the signaling radio bearer between the second network device and the UE, the method further comprises:

receiving, by the second network device, a signaling radio bearer establishment request sent by the first network device, and determining, by the second network device, the identifier of the signaling radio bearer, wherein the signaling radio bearer establishment request is for requesting the second network device to establish the signaling radio bearer between the second network device and the UE; and determining, by the first protocol layer entity of the second network device, the integrity protection parameters and the integrity protection algorithm comprises:

obtaining, by the first protocol layer entity of the second network device, a first key sent by the first network device and at least one integrity protection algorithm that the UE supports;

generating, by the first protocol layer entity of the second network device, a first random number;

generating, by the first protocol layer entity of the second network device, a second key based on the first random number and the first key, and generating, based on the second key, the third key for performing the integrity protection on the signaling radio bearer between the second network device and the UE; and determining, by the first protocol layer entity of the second network device, the integrity protection algorithm in the at least one integrity protection algorithm that the UE supports.

3. The method according to claim 2, wherein the first key is generated by the first network device based on a cell identifier of a primary serving cell, of the UE, operated by the second network device, a carrier frequency of the primary serving cell, and a root key; and the root key is usable to generate a key for performing integrity protection on control signaling between a central unit (CU) and the UE.

4. The method according to claim 3, wherein if the root key is changed, the method further comprises:

receiving, by the second network device, a key update request message sent by the first network device, wherein the key update request message comprises a new first key generated based on the changed root key;

generating, by the first protocol layer entity of the second network device, a second random number;

sending, by the first protocol layer entity of the second network device, a key modification request message to the UE, wherein the key modification request message comprises the second random number; and receiving, by the first protocol layer entity of the second network device, a key modification response message returned by the UE.

5. The method according to claim 2, wherein the first key and the at least one integrity protection algorithm that the UE supports are included in the signaling radio bearer establishment request, and the method further comprises:

returning, by the second network device, a signaling radio bearer establishment response message to the first network device, wherein the signaling radio bearer establishment response message comprises: the identifier of the signaling radio bearer, the first random number, and the integrity protection algorithm.

6. The method according to claim 2, wherein the method further comprises:

returning, by the second network device, a signaling radio bearer establishment response message to the first network device, wherein the signaling radio bearer establishment response message comprises the identifier of the signaling radio bearer;

receiving, by the second network device, a security context establishment request message of the UE sent by the first network device, wherein the security context establishment request message of the UE comprises: the first key, and the at least one integrity protection algorithm that the UE supports;

returning, by the second network device, a security context establishment response message to the first network device; and sending, by the first protocol layer entity of the second network device, a security activation message to the UE, wherein the security activation message comprises: the first random number and the integrity protection algorithm.

7. The method according to claim 2, wherein the method further comprises:

generating, by the first protocol layer entity of the second network device, a third random number;

sending, by the first protocol layer entity of the second network device, a key modification request message to the UE, wherein the key modification request message comprises the third random number; and receiving, by the first protocol layer entity of the second network device, a key modification response message returned by the UE.

8. The method according to claim 1, wherein the first protocol layer entity is a Radio Resource Control Protocol (RRC) layer entity; and the second protocol layer entity is a Packet Data Convergence Protocol (PDCP) layer entity.

9. A control signaling processing method, performed by user equipment (UE), wherein the method comprises:
- establishing, by the UE, a signaling radio bearer between the UE and a second network device, and transmitting control signaling between the UE and the second network device through the signaling radio bearer;
- determining, by the UE, integrity protection parameters and an integrity protection algorithm for performing integrity protection on the control signaling;
- receiving, by the UE, control signaling sent by the second network device, the control signaling carrying a message authentication code MAC-I; and
- performing, by the UE, integrity check on the control signaling based on the integrity protection parameters and the integrity protection algorithm;
- wherein the determining, by the UE, the integrity protection parameters and the integrity protection algorithm comprises:
  - receiving, by the UE, a security activation command sent by a first network device, wherein the security activation command comprises an integrity protection algorithm for performing integrity protection on a signaling radio bearer between the first network device and the UE, and the security activation command is for activating the signaling radio bearer between the first network device and the UE;
  - generating, by the UE, a root key based on the security activation command; and
  - generating, by the UE, based on the root key, a key for performing integrity protection on the signaling radio bearer between the second network device and the UE.

10. The method according to claim 9, wherein the integrity protection parameters comprise:
- an identifier of the signaling radio bearer between the second network device and the UE, and
- the key for performing the integrity protection on the signaling radio bearer between the second network device and the UE; and
- the determining, by the UE, the integrity protection parameters and the integrity protection algorithm further comprises:
  - receiving, by the UE, a Radio Resource Control (RRC) connection reconfiguration message sent by the first network device;
  - obtaining, by the UE, the identifier of the signaling radio bearer between the UE and the second network device, a first random number, and the integrity protection algorithm from the RRC connection reconfiguration message, wherein the first random number is generated by the second network device, and the integrity protection algorithm is selected by the second network device from at least one integrity protection algorithm that the UE supports;
  - generating, by the UE, a first key based on the root key;
  - generating, by the UE, a second key based on the first random number and the first key; and
  - generating, based on the second key, the key for performing the integrity protection on the signaling radio bearer between the second network device and the UE.

11. The method according to claim 10, wherein the generating, by the UE, the first key based on the root key comprises:
- generating, by the UE, the first key based on a cell identifier of a primary serving cell, of the UE, operated by the second network device, a carrier frequency of the primary serving cell, and the root key.

12. The method according to claim 10, wherein the method further comprises:
- generating, by the UE, a new root key;
- receiving, by the UE, a key modification request message sent by the second network device, wherein the key modification request message comprises a second random number;
- generating, by the UE, a new first key based on the new root key;
- generating, by the UE, a new second key based on the second random number and the new first key;
- generating, based on the new second key, a new key for performing the integrity protection on the signaling radio bearer between the second network device and the UE; and
- returning, by the UE, a key modification response message to the second network device.

13. The method according to claim 10, wherein the method further comprises:
- receiving, by the UE, a key modification request message sent by the second network device, wherein the key modification request message comprises a third random number;
- generating, by the UE, a new second key based on the third random number and the first key;
- generating, based on the new second key, a new key for performing the integrity protection on the signaling radio bearer between the second network device and the UE; and
- returning, by the UE, a key modification response message to the second network device.

14. The method according to claim 9, wherein the integrity protection parameters comprise:
- an identifier of the signaling radio bearer between the second network device and the UE, and
- the key for performing the integrity protection on the signaling radio bearer between the second network device and the UE; and
- the determining, by the UE, the integrity protection parameters and the integrity protection algorithm comprises:
  - receiving, by the UE, a Radio Resource Control (RRC) connection reconfiguration message sent by the first network device;
  - obtaining, by the UE, the identifier of the signaling radio bearer between the second network device and the UE from the RRC connection reconfiguration message;
  - receiving, by the UE, a security activation message sent by the second network device;
  - obtaining a first random number and the integrity protection algorithm from the security activation message, wherein the first random number is generated by the second network device, and the integrity protection algorithm is selected by the second network device from at least one integrity protection algorithm that the UE supports;
  - generating, by the UE, a first key based on the root key;
  - generating, by the UE, a second key based on the first random number and the first key; and
  - generating, based on the second key, the key for performing the integrity protection on the signaling radio bearer between the second network device and the UE.

15. A control signaling processing method, wherein the method is applied to an access network architecture comprising a first network device and a second network device, wherein the first network device is connected to the second network device, the second network device is connected to at least one user equipment (UE), the method is performed by the second network device, the second network device comprises a first protocol layer entity, and the method comprises:
- generating, by the first protocol layer entity of the second network device, control signaling between the second network device and UE, the UE being any one of the at least one UE;
- determining, by the first protocol layer entity of the second network device, integrity protection parameters and an integrity protection algorithm, wherein the integrity protection parameters and the integrity protection algorithm are for performing integrity protection on the control signaling between the second network device and the UE;
- determining, by the first protocol layer entity of the second network device, a message authentication code MAC-I based on the integrity protection parameters and the integrity protection algorithm; and
- generating, by the first protocol layer entity of the second network device, the control signaling, and sending, to the UE, the control signaling carrying the MAC-I;
- wherein the determining, by the first protocol layer entity of the second network device, the integrity protection parameters and the integrity protection algorithm comprises:
  - receiving, by the first protocol layer entity of the second network device, a security context establishment request message sent by the first network device, wherein the security context establishment request message comprises: a first key, and at least one integrity protection algorithm that the UE supports;
  - generating, by the first protocol layer entity of the second network device, based on the first key, a key for performing integrity protection on the signaling radio bearer between the second network device and the UE; and
  - determining, by the first protocol layer entity of the second network device, the integrity protection algorithm in the at least one integrity protection algorithm that the UE supports.

16. The method according to claim 15, wherein the first protocol layer entity is a Radio Link Control (RLC) entity or a Media Access Control MAC layer entity.

17. The method according to claim 15, wherein the integrity protection parameters comprise:
- a BEARER parameter value,
- a count, and
- the key for performing the integrity protection on the signaling radio bearer between the second network device and the UE; and
- the determining, by the first protocol layer entity of the second network device, the integrity protection parameters and the integrity protection algorithm further comprises:
  - generating, by the first protocol layer entity of the second network device, a first random number;
  - generating, by the first protocol layer entity of the second network device, a second key based on the first random number and the first key; and
  - generating, by the first protocol layer entity of the second network device, based on the second key, the key for performing the integrity protection on the signaling radio bearer between the second network device and the UE.

18. The method according to claim 17, wherein the first key is generated by the first network device based on a cell identifier of a primary serving cell, of the UE, operated by the second network device, a carrier frequency of the primary serving cell, and a root key.

19. The method according to claim 18, wherein, in response to the root key being changed, the method further comprises:
- receiving, by the first protocol layer entity of the second network device, a key update request message sent by the first network device, wherein the key update request message comprises a new first key generated based on the changed root key;
- generating, by the first protocol layer entity of the second network device, a second random number;
- sending, by the first protocol layer entity of the second network device, a key modification request message to the UE, wherein the key modification request message comprises the second random number; and
- receiving, by the first protocol layer entity of the second network device, a key modification response message returned by the UE.

20. The method according to claim 17, wherein the method further comprises:
- returning, by the first protocol layer entity of the second network device, a security context establishment response message to the first network device; and
- sending, by the first protocol layer entity of the second network device, a security activation message to the UE, wherein the security activation message comprises: the first random number, the BEARER parameter value, and the integrity protection algorithm.

* * * * *